United States Patent
Okumura et al.

[11] Patent Number: 6,129,377
[45] Date of Patent: Oct. 10, 2000

[54] AIR BAG FOR SIDE AIR BAG DEVICE

[75] Inventors: Katsuhiro Okumura, Toyota; Toshinori Tanase, Gifu; Eisiti Nakamura, Ichinomiya; Takashi Yamamoto, Nagoya; Choko Terazawa, Ichinomiya; Yasuo Ochiai, Aichi; Hideyuki Fujiwara; Shinji Kondo, both of Inazawa; Yasushi Kubota, Toyota; Hiroki Nakajima, Nagoya; Shuji Miura, Okazaki, all of Japan

[73] Assignees: Toyoda Gosei Co., Ltd.; Toyota Jidosha Kabushiki Kaisha, both of Aichi, Japan

[21] Appl. No.: 09/101,721

[22] PCT Filed: Nov. 5, 1997

[86] PCT No.: PCT/JP97/04018

§ 371 Date: Jul. 7, 1998

§ 102(e) Date: Jul. 7, 1998

[87] PCT Pub. No.: WO98/19894

PCT Pub. Date: May 14, 1998

[30] Foreign Application Priority Data

| Nov. 7, 1996 | [JP] | Japan | 8-295543 |
| Nov. 7, 1996 | [JP] | Japan | 8-295546 |
| Dec. 25, 1996 | [JP] | Japan | 8-346277 |
| Dec. 25, 1996 | [JP] | Japan | 8-346293 |
| Dec. 25, 1996 | [JP] | Japan | 8-346298 |
| Jun. 24, 1997 | [JP] | Japan | 9-167736 |

[51] Int. Cl.[7] ................................................. B60R 21/22
[52] U.S. Cl. ............................. 280/730.2; 280/743.1
[58] Field of Search .................. 280/730.1, 730.2, 280/743.1, 743.2, 728.1

[56] References Cited

U.S. PATENT DOCUMENTS

| 3,731,949 | 5/1973 | Radke | 280/150 |
| 5,322,322 | 6/1994 | Bark et al. | 280/730 |
| 5,333,898 | 8/1994 | Stutz | 280/730 |
| 5,540,459 | 7/1996 | Daniel | 280/730.2 |
| 5,586,782 | 12/1996 | Zimmerman II et al. | 280/730.2 |
| 5,605,346 | 2/1997 | Cheung et al. | 280/728.2 |
| 5,788,270 | 8/1998 | HÅland et al. | 280/729 |
| 5,884,937 | 3/1999 | Yamada | 280/730.2 |
| 5,899,491 | 5/1999 | Tschaeschke | 280/730.2 |
| 5,921,575 | 7/1999 | Kretschmer et al. | 280/728.2 |
| 5,921,576 | 7/1999 | Sinnhuber | 280/730.2 |
| 5,938,233 | 8/1999 | Specht | 280/730.2 |

FOREIGN PATENT DOCUMENTS

| 0 584 781 | 3/1994 | European Pat. Off. |  |
| 2 222 621 | 11/1972 | Germany . |  |
| 4-146840 | 5/1992 | Japan | 280/743.1 |
| 5-16751 | 1/1993 | Japan . |  |
| 5-131889 | 5/1993 | Japan . |  |
| 6-227340 | 8/1994 | Japan . |  |
| 7-506789 | 7/1995 | Japan . |  |
| 2 267 065 | 11/1993 | United Kingdom | 280/730.2 |
| 96/26087 | 11/1996 | WIPO . |  |

*Primary Examiner*—Paul N. Dickson
*Attorney, Agent, or Firm*—Pillsbury Madison & Sutro, LLP

[57] ABSTRACT

An air bag (11) for a side air bag device capable of reducing the size and weight of the device (M1) while retaining a tension line (L—L) when expanded is mounted on the peripheral edge of a door opening (W) at the inside of a compartment, and is formed into a generally rectangular bag shape for covering the door opening when expanded, while being equipped with a gas inlet (19) for introducing an expanding gas. The air bag is provided with joints (22) jointing an inner side wall (12) and an outer side wall (13) partially so as to form a tension line L—L when expanded. The individual joints (22) are juxtaposed in plurality along the tension line so as to cross the tension line, and are arranged generally at vertically middle portions so as to form one expansion chamber (18) having upper and lower spaces (18a and 18b) for the expanding gas to flow therethrough.

26 Claims, 29 Drawing Sheets

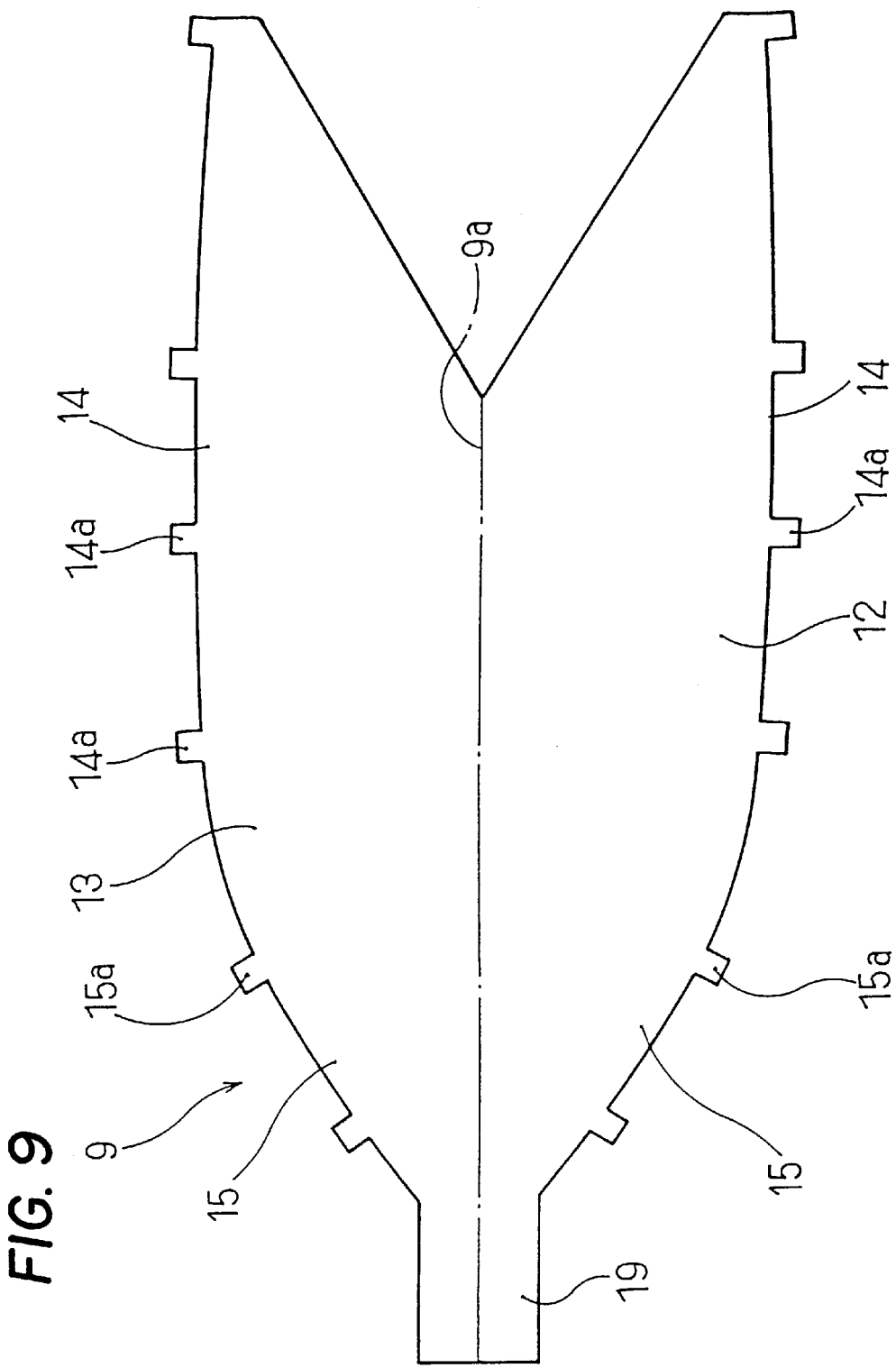

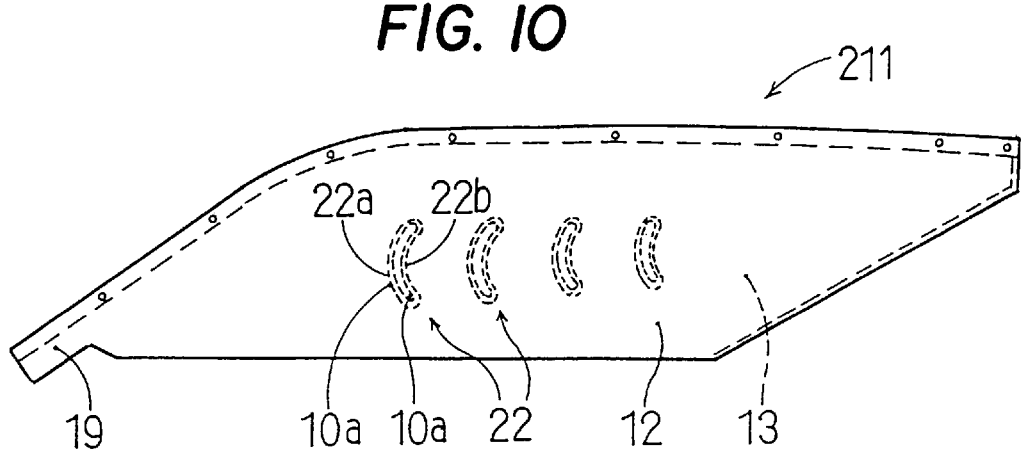
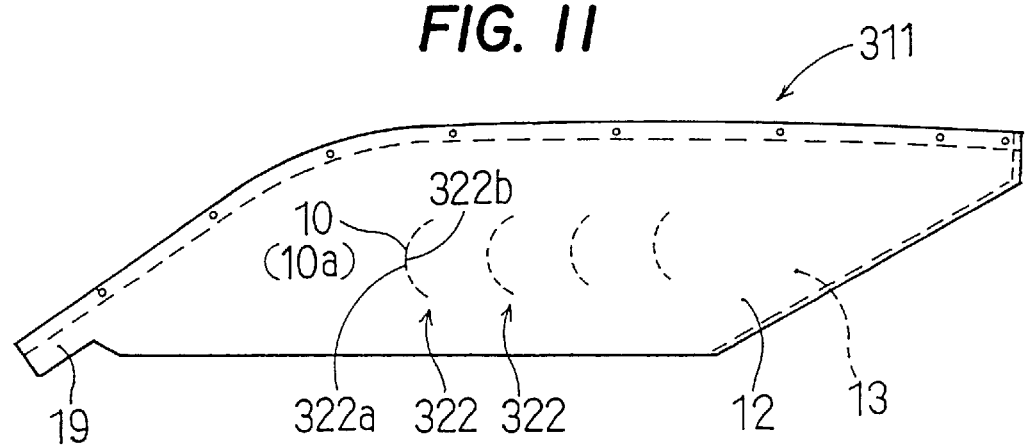
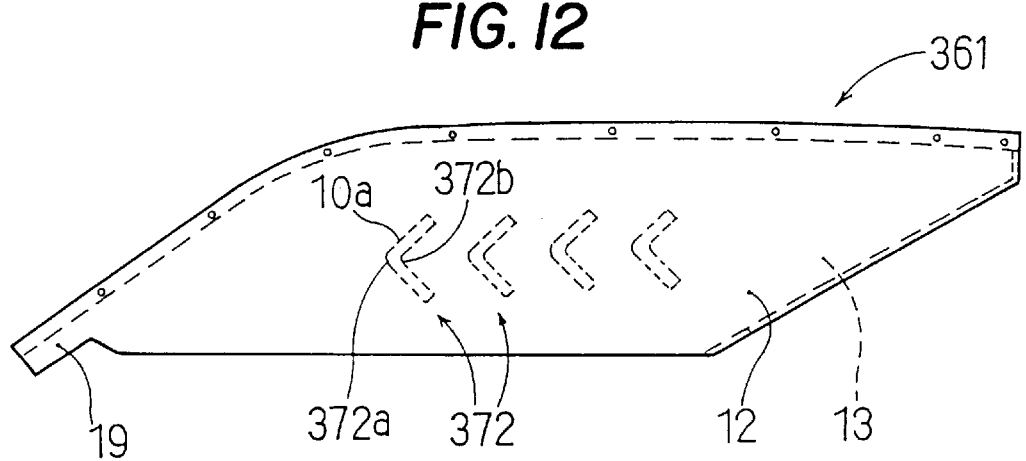

AIR BAG FOR SIDE AIR BAG DEVICE

TECHNICAL FIELD

The present invention relates to an air bag for a side air bag device, which is mounted on the peripheral edge of a door opening inside of the compartment of the body of a vehicle, and which is formed into a generally rectangular bag shape for covering, such that, when opened, the door opening to protect the head of a passenger.

BACKGROUND ART

A side air bag device M0 of this kind in the prior art is constructed, as shown in FIG. 38, to include an air bag 1 mounted on the peripheral edge of a door opening W inside of the compartment of the body of a vehicle, and an inflator 7 for discharging an expanding gas to inflate the air bag 1.

The air bag 1 is composed of a plurality of expansion chambers to be expanded into bags, uninflatable flat walls 4, 4 arranged at the front and rear sides of the vehicle in the expansion chamber 2, and a pipe insert 5 into which a pipe 6 for feeding the expanding gas from the inflator 7 is to be inserted.

The expansion chamber 2 is partitioned by joints 3 which are formed by stitching the inner side wall and the outer side wall of the air bag 1 generally vertically from their respective upper to lower edges.

When this air bag 1 is to be inflated, the expanding gas is fed from the inflator 7 via the pipe 6 and through its not-shown through-holes to inflate the individual expansion chambers 2.

As these expansion chambers 2 are inflated, there is established a tension along a line L—L which extends from the lower side to the obliquely upper side of the peripheral edge of the door opening W of the air bag 1, so that the air bag 1 can restrain the head of a passenger reliably by the tension line L—L, even when the air bag 1 is impacted by the passenger's head.

Here, the air bag 1 is mounted on the generally L-shaped portion or the peripheral edge of the door opening W. Unless the tension is established on the tension line L—L at the time of expansion, the air bag 1 will merely move but fail to restrain the passenger's head properly even when it is impacted by the head.

In the air bag 1 of the prior art, however, the expanding gas is fed to the expansion chambers 2 which are partitioned in plurality, and the expanding gas from the inflator 7 is fed via the long pipe 6 sequentially into the individual expansion chambers 2. Since the pipe 6 is inserted into the air bag 1, the air bag 1 is mounted in a bulky state within the vehicle to enlarge the size of the side air bag device M0.

In the air bag 1 of the prior art, on the other hand, the expanding gas is fed to the expansion chambers 2 which are partitioned in plurality by the joints 3. The expanding gas from the inflator 7 is fed via the long pipe 6 sequentially into the individual expansion chambers 2 so that the pressure-loss of the expanding gas is high. Unless the inflator 7 has a high output, the time period for completing the expansion of the air bag 1 until the tension is exhibited on the tension line L—L is prolonged.

Moreover, the air bag 1 of the prior art is folded along the pipe insert 5 on the peripheral edge of the opening W. The individual joints 3, as formed by stitching the inner side wall and the outer side wall to form the plural expansion chambers 2, are formed in the folding direction perpendicular to the pipe insert 5. However, the stitching threads forming the individual joints 3 overlap one another when the air bag 1 is folded, and the joints 3 per se forming the expansion chambers 2 are numerous, so that the air bag 1 cannot be folded compactly, which makes it difficult to retain sufficient space for the bag itself.

The present invention has been conceived to solve the above-specified problems, and has as its object to provide an air bag for a side air bag device, which can reduce the size and weight of the device while retaining the tension line at the time of expansion.

Another object of the invention is to provide an air bag for a side air bag device, which can suppress the pressure loss of the expanding gas and employ an inflator of a low output.

Still another object of the invention is to provide an air bag for a side air bag device, which can be folded compactly.

DISCLOSURE OF THE INVENTION

According to the invention, there is provided an air bag for a side air bag device adapted for mounting on the peripheral edge of a door opening inside of the compartment of a vehicular body, which has a generally rectangular bag shape having a gas inlet in the lower side of the door opening peripheral edge for introducing an expanding gas so as to cover the door opening when expanded, and in which a tensing joint partially jointing an inner side wall and an outer side wall is arranged to form a tension line for establishing a tension from the lower side to an obliquely upper side of the door opening peripheral edge at the time of expansion, characterized in that a plurality of the tensing joints are so juxtaposed along the direction of the tension line as to cross the tension line; and in that the individual tensing joints are arranged generally at vertical middle portions so as to form one expansion chamber having upper and lower spaces for the expanding gas to flow therethrough.

With this construction, when the air bag is to be expanded, the expanding gas smoothly flows from the gas inlet through the upper and lower spaces of the individual joints to the portions between the joints. In other words, the expanding gas can be smoothly fed without separately inserting the pipe into the air bag so that the size and weight of the device can be reduced as a result of the elimination of the pipe.

On the other hand, the expanding gas flows through the upper and lower spaces of the air bag so that the air bag can be expanded in a short time-period.

At the completion of the inflation (that is, at the completion of the expansion), the tension line is formed so that the passenger's head can be smoothly restrained.

At the completion of the inflation, moreover, a longitudinal expansion is formed in the lower portion of the air bag by the lower space so that the air bag can be further prevented from bending to enhance its performance in restraining the passenger.

In connection with the air bag according to the invention, moreover, the individual tensing joints are desirably shaped to have curved bulges bulging toward the gas inlet.

With this construction, the expanding gas is smoothly separated vertically to flow to the portions separate from the gas inlet, even if the expansion gas impinges upon the joints, so that the pressure loss of the expanding gas can be suppressed to make it possible to employ the inflator of a low output.

In the air bag thus constructed, moreover, the individual tensing joints may have such recesses at the side opposed to the gas inlet so as to be recessed toward the gas inlet.

With this construction, as compared with the construction having no recess, the inner side wall and the outer side wall between the adjoining joints are individually pulled vertically so that the respective tensions in the juxtaposing direction of the joints, i.e., the respective tension of the tension line, can be increased to enhance the restraining performance of the air bag.

In connection with the air bag of the invention, on the other hand, the joint arranged at the peripheral edge for forming the expansion chamber, and the individual joints for establishing the tension, may be formed by stitching the inner side wall and the outer side wall.

With this construction, when the air bag is to be expanded, the tension can be dispersed to act on the expansion chamber-forming joint and the individual tensing joints, thereby to improve the respective strengths of the joint portions.

Still moreover, the joint arranged at the peripheral edge for forming the expansion chamber, and the individual joints for establishing the tension, are desirably formed by stitching the inner side wall and the outer side wall on condition that interposing a sheet material having an elasticity between the inner side wall and the outer side wall.

With this construction, the seams are sealed with the sheet material so that the leakage of the expanding gas at the time of inflating the air bag can be suppressed to improve the retention of the internal pressure of the air bag being inflated.

Still moreover, the individual tensing joints are desirably formed by stitching the inner side wall and the outer side wall into a closed loop.

With this construction, as compared with the case of linear stitching, the stress concentration resulting from the tension acting upon the inner side wall and the outer side wall at the time of expansion can be suppressed to act on the stitched end portions of the joints, thereby to improve the respective tensile strengths of the individual joints.

Still moreover, the joint arranged at the peripheral edge for forming the expansion chamber, and the individual joints for establishing the tension, may be formed by adhering the inner side wall and the outer side wall together.

With this construction, as compared with the case in which the joints are formed by stitchig them together with stitching thread, the absence of any seam suppresses the leakage of the expanding gas at the time of inflating the air bag, so that there is improved retention of the internal pressure of the air bag being inflated.

Moreover, a front side fixed point of the air bag is set under a front pillar, whereas a rear side fixed point of the air bag is set in a roof side rail near a quarter pillar.

With this construction, the air bag is expanded entirely over the longitudinally wide range of the compartment, so that it can restrain the head of a passenger reliably, even with any changes in the longitudinal position of the seat or in the seated position of the passenger.

Still moreover, in connection with the air bag of the invention, the air bag may be so arranged that its expansion area can include, when expanded, a portion of a center pillar so as to be supported by the center pillar when expanded.

With this construction, when the completely expanded air bag is impacted by the passenger's head, the air bag is jointed to and supported by not only the peripheral edge of the door opening, but also the center pillar, so that it can becomes more difficult to bend. This results in an enhancement of performance in terms of restraining the passenger.

Moreover, the portion to be supported by the center pillar at the time of expansion may be expanded such that it is thicker than the remaining ordinary expansion thickness.

With this construction, the cushioning effect of the air bag can be enhanced so as to restrain the passenger, even if it the air bag interferes with the center pillar. As compared with the case in which the portion to be supported by the center pillar is as thick as the remaining ordinary expansion thickness, the cushioning effect can be retained even if the initial internal pressure in the air bag is lowered. Thereby, the output of the inflator can be lowered, and the air bag sealing method can be simplified, in order to reduce the size of the side air bag device.

When the portion of the air bag being expanded to be supported by the center pillar is set to be expanded thicker than the remaining ordinary expansion thickness, the expansion portion to be supported by the center pillar at the time of expansion is so desirably formed that the gap between the adjoining joints is set larger than that of the adjoining joints in the remaining ordinary expansion area. With this construction, the expansion portion to be supported by the center pillar can be easily made thicker than the remaining ordinary expansions thickness.

In connection with the air bag according to the invention, moreover, a front side fixed point is set under a front pillar, whereas a rear side fixed point is set under a quarter pillar.

With this construction, the air bag, when expanded, is arranged at the side of not only the front seat but also the back seat, so that it can restrain respective heads of the passengers seated not only in the front seat but also in the back seat.

In connection with the air bag according to the invention, moreover, a front side fixed point is set under a front pillar. As compared with the case in which the front side fixed point is fixed on the front pillar, the air bag can be expanded over a wide range to retrain the passenger over this wide range.

In connection with the air bag according to the invention, on the other hand, a strap for jointing the inner side wall and the outer side wall to each other may be arranged between the joints at the side of the gas inlet and the gas inlet.

With this construction, even if the expanding gas flows from the gas inlet so as to establish a high tension at the inner side wall and the outer side wall at the gas inlet side, the tension can be obstructed by the strap in order to lower the tension acting on the gas inlet side of the joints for establishing the tension line at the time of expansion. In short, the joints at the inlet side of the expanding gas can be protected by the strap.

Moreover, the strap is desirably arranged to have its width direction generally at a right angle with respect to the inflow direction of the expanding gas from the gas inlet.

With this construction, the expanding gas is directly impacted the straps, and the joints at the gas inlet side can be indirectly impacted by the gas with reduced expansion force so that these joints can be better protected.

According to the invention, moreover, there is provided another air bag for a side air bag device adapted to be mounted at the peripheral edge of a door opening inside of the compartment of a vehicular body, which other air bag has a generally rectangular bag shape having a gas inlet in the lower side of the door opening peripheral edge for introducing an expanding gas so as to cover the door opening when expanded, in which a tensing joint partially jointing an inner side wall and an outer side wall is arranged to form a tension line for establishing a tension from the lower side to an obliquely upper side of the door opening peripheral edge at the time of expansion, and which is folded and accommodated in the door opening peripheral edge;

and is characterized: in that a plurality of the tensing joints are juxtaposed along the direction of the tension line so as to cross the tension line;

in that the individual tensing joints are arranged generally at vertical middle portions so as to form one expansion chamber having upper and lower spaces for the expanding gas to flow therethrough; and in that the air bag is folded and accommodated in a bellows shape with its folded overlapping faces being generally at a right angle with respect to the door inner face.

In the air bag thus constructed, there is only one expansion chamber at the time of expansion so that the projecting side joint, as folded when accommodated to project at the time of expansion, of the expansion chamber forming joints arranged on the peripheral edge for forming the expansion chamber can be reduced in size. As a result, the air bag can have reduced bulkiness after being completely folded, even if it is folded so as to overlap the stitching thread or adhesive to be formed at the projecting side joint. On the other hand, the tensing joints are disposed generally at the vertically middle portions in the expansion chamber so that they are short in vertical height. This arrangement can contribute to not only reduced in bulkiness of the folded air bag, but also increased thinness of the folded air bag, even if the stitching thread or adhesive for forming the tensing joints is over lapped.

As a result, the air bag thus constructed can be folded compactly. Since the air bag is folded and accommodated in a bellows shape with its folded overlapping faces being generally at a right angle with respect to the door inner face, the air bag can be quickly expanded along the door inner face.

In connection with the air bag, still moreover, the expansion chamber of the air bag may be manufactured by folding one cloth material and by jointing the peripheral edges of the cloth material excepting the creases thereof such that the creases of the cloth material at the time of forming the expansion chamber are arranged at the portions which are to be folded into the belows shape at the accommodation time.

With this construction, the projecting side joint of the expansion chamber forming joints to be arranged on the peripheral edge can be further reduced, as a result, the air bag can be folded more compactly.

Moreover, of the expansion chamber forming joints arranged in the peripheral edge for forming the expansion chamber, the projecting side joint, as folded when accommodated but protruding when expanded, is desirably arranged to be cross folded in the overlapping direction.

With this construction, the stitching thread or adhesion for forming the projecting side joint can be displaced when the air bag is folded. As a result, the air bag can be folded more compactly, and with reduced bulkiness after the completion of the folding operation.

Still moreover, the air bag is formed, when expanded, into a parallelogram bag shape, having two sides of an upper side with mounting members to be mounted on the peripheral edge of the opening inside of the compartment, and an oblique side leading at an obtuse angle obliquely downward from the upper side, and the air bag is folded and accommodated so as to have creases in parallel with the upper side and to overlap the upper side at a right angle.

With this construction, the air bag is folded from the upper side sequentially with the crest and valley creases while holding the mounting members of the upper side such that the creases are made straight. As a result, the air bag can be easily folded by a simple operation. Here, the mounting members of the oblique side may be pulled out after the folding operation, and the air bag can be easily mounted on the peripheral edge of the opening because it is not inflated so as to have no tension line, in order that it can be easily deflected.

On the other hand, the air bag is accommodated within a case so as to be fastened together with the body so that the air bag can be prevented from collapsing or being displaced out of position when assembled.

Moreover, the air bag is wrapped, when accommodated, in a folded state so that it can be even more prevented from collapsing, and so that the air bag can be protected from any foreign substance when folded. Moreover, the air bag can be folded more compactly if wrapped while under a vacuum state. And by wrapping, the front pillar can also be made thinner be to improve the front view, and the roof side rail can be made thinner to widen the compartment.

BRIEF DESCRIPTION OF DRAWINGS

FIG. 9 is a top plan view showing a cloth member for manufacturing the air bag of the embodiment;

FIG. 10 is a front elevation showing a modification of the air bag when inflated;

FIG. 11 is a front elevation showing another modification of the air bag when inflated;

FIG. 12 is a front elevation showing still another modification of the air bag when inflated;

PREFERRED EMBODIMENTS OF THE INVENTION

Figure 1:
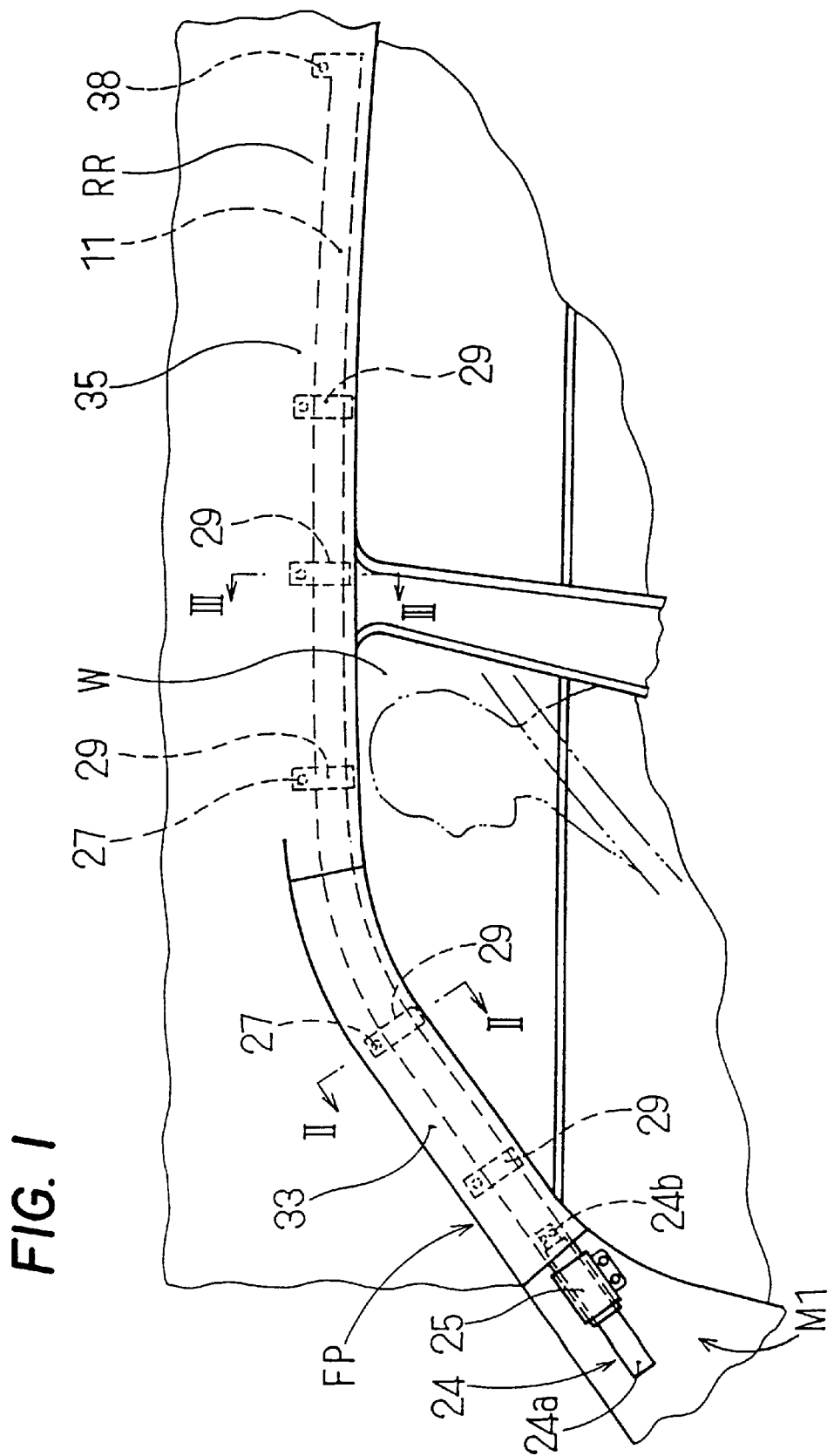
FIG. 1 is a front elevation taken from the inside of a vehicular compartment, and shows a side air bar device employing an air bag according to a first embodiment of the invention.
Figure 4:
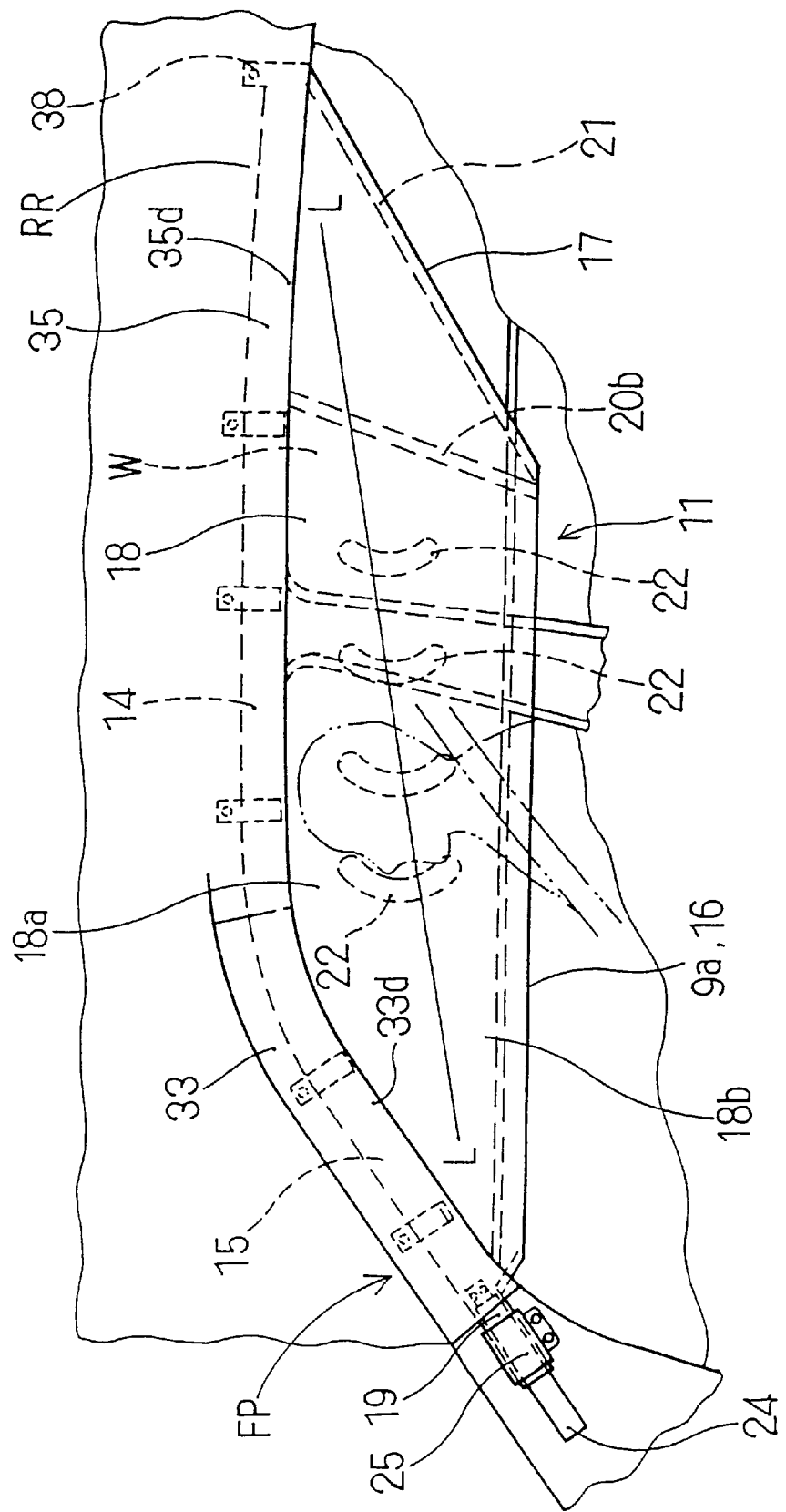
FIG. 4 is a view showing the side air bag device, when in an activated state, as employing the air bag of the embodiment.

An air bag 11 of a first embodiment is applied to a side air bag device M1 to be arranged from a front pillar FP of the peripheral edge of an opening W of a window inside of a vehicular compartment to the rear side of a roof side rail RR, as shown in FIGS. 1 and 4. The side air bag device M1 is constructed to include: the air bag 11 folded and accommodated in the generally L-shaped spatial portion from the front pillar FP to the rear portion of the roof side rail RR; and an inflator 24 for feeding an inflating gas to the air bag 11.

The air bag 11 is constructed, as shown in FIGS. 4 to 8, to include an inner side wall 12, an outer side wall 13 and a cylindrical gas inlet 19 positioned at a lower position for introducing the inflating gas, and such that it takes a generally plate-like parallelogram bag shape when inflated, which is comprised of an upper side 14, an oblique side 15 leading obliquely downward at an obtuse angle from the upper side 14, a lower side 16 leading from the oblique side 15 and confronting the upper side 14 generally in parallel, and a rear side 17 joining the rear ends of the upper side 14 and the lower side 16.

Figure 5:
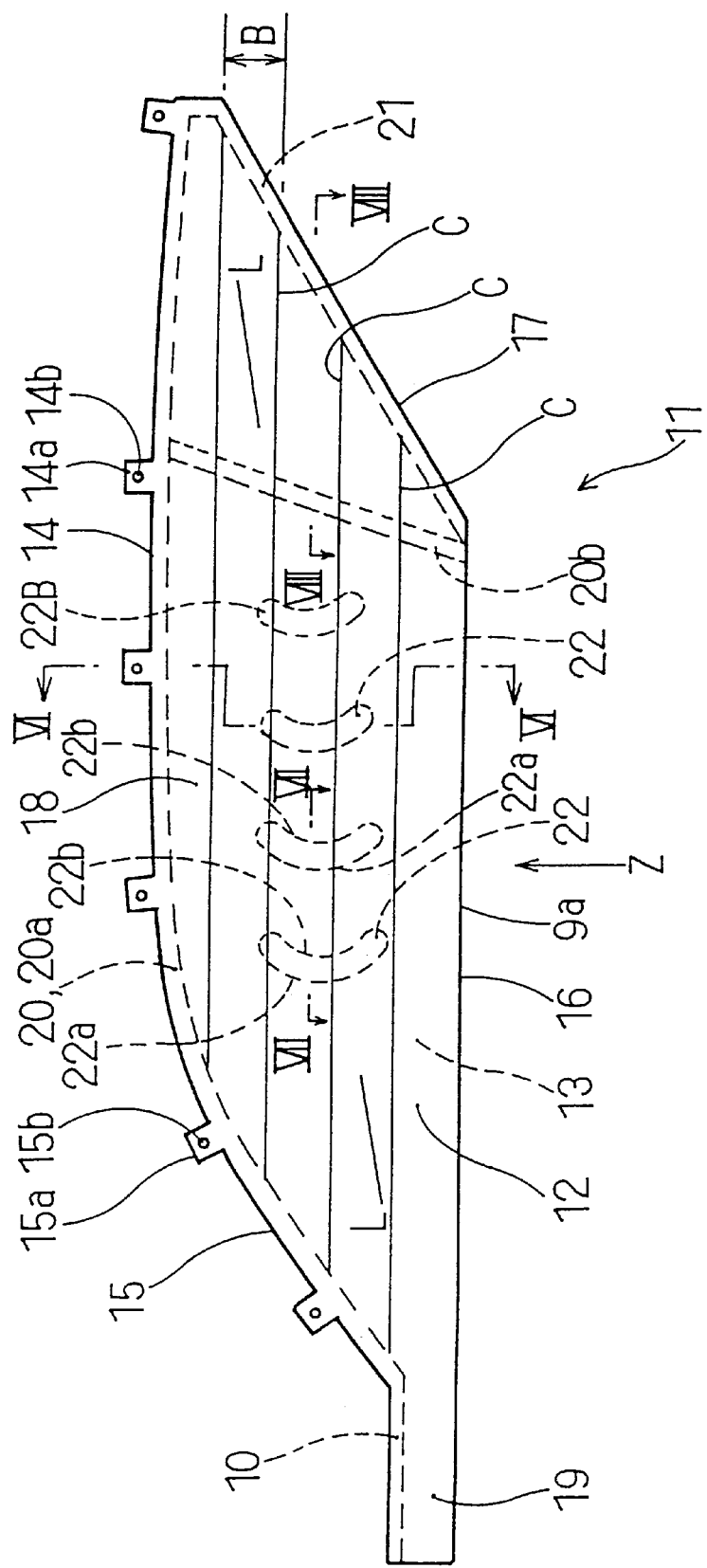
FIG. 5 is a front elevation showing the air bag of the embodiment when inflated.
Figure 6:
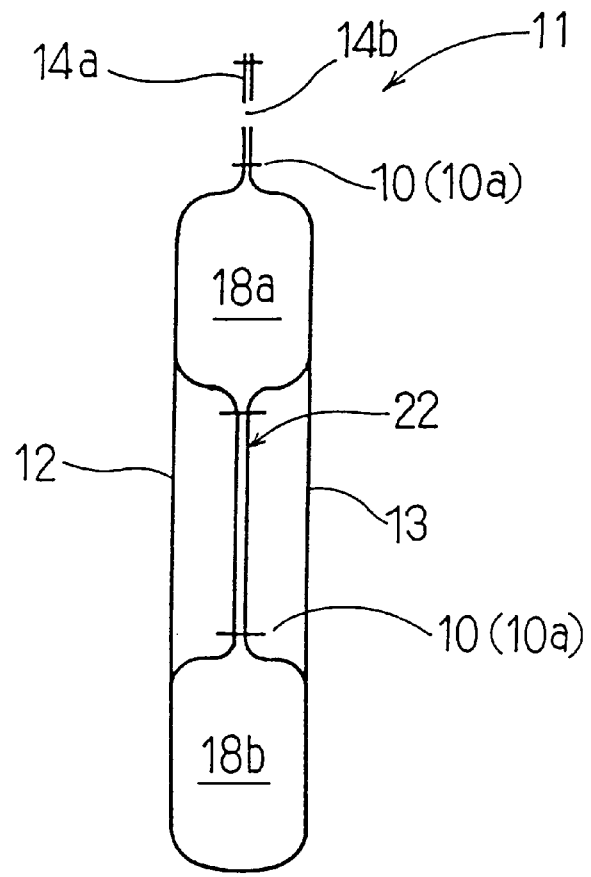
FIG. 6 is an enlarged section taken along line VI—VI of FIG. 5.
Figure 7:
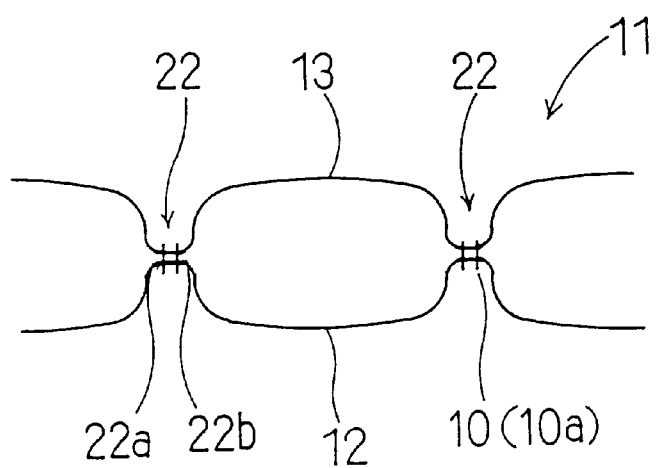
FIG. 7 is an enlarged section taken along line VII—VII of FIG. 5.

Moreover, the air bag 11 of the first embodiment is made of a generally arrow-feather shaped cloth member 9 having a crease 9a at the lower side 16 forming the lower edge of the inner side wall 12 and the outer side wall 13, as shown in FIGS. 5 and 9. The air bag 11 is formed into a bag shape by folding the cloth member 9 along the center crease 9a, and by stitching the cloth material 9 along a predetermined peripheral edge with joint means 10 such as a stitching thread 10a of polyester or the like, so as to form a joint 20 for forming one expansion chamber 18. The cloth material 9 is made of woven fabric of polyamide or polyester and has flexibility. The stitching is performed using chain stitching or the lock stitching method.

Figure 17:
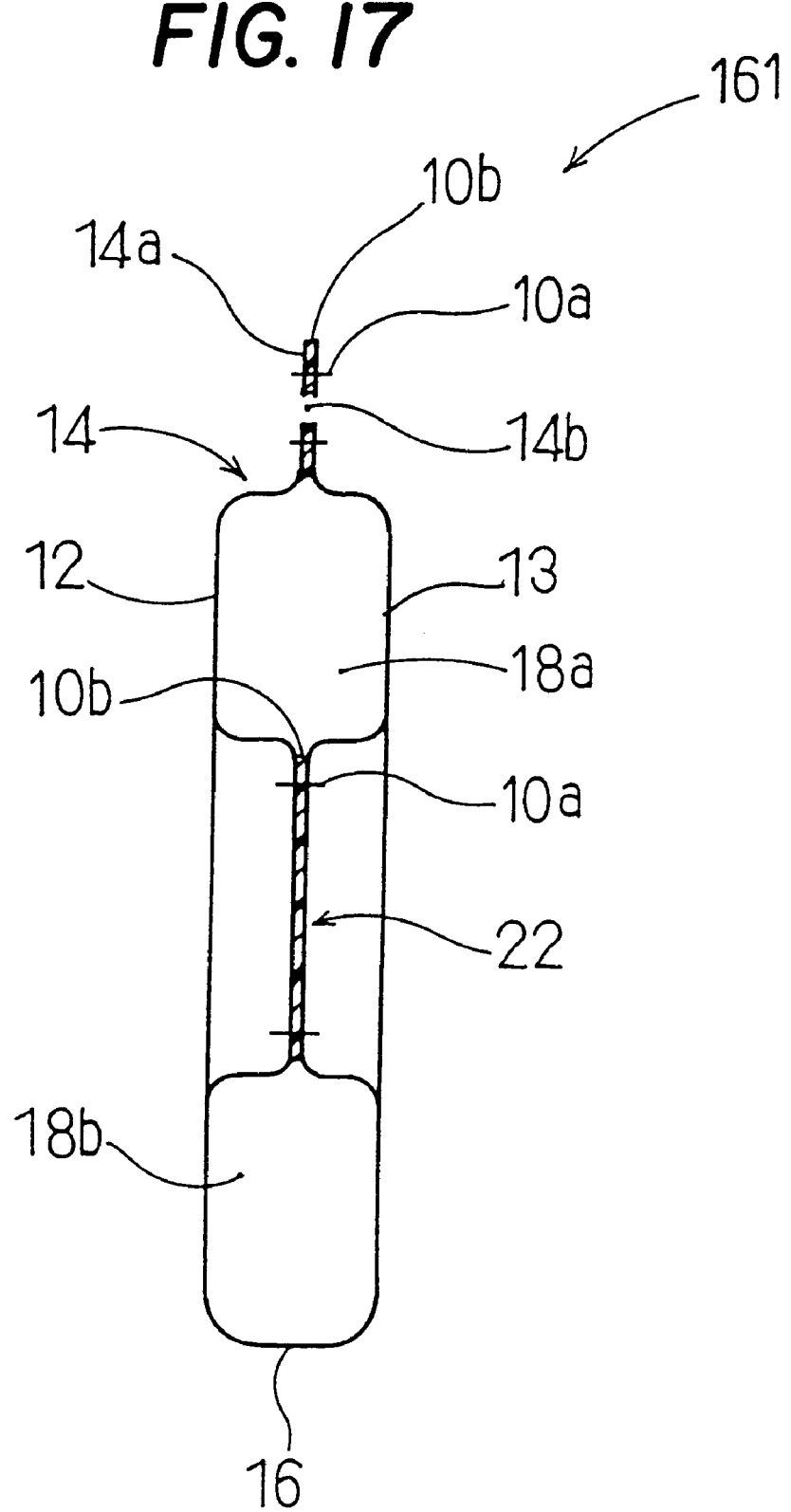
FIG. 17 is a section corresponding to FIG. 6, but shows a modification of joint means.
Figure 18:
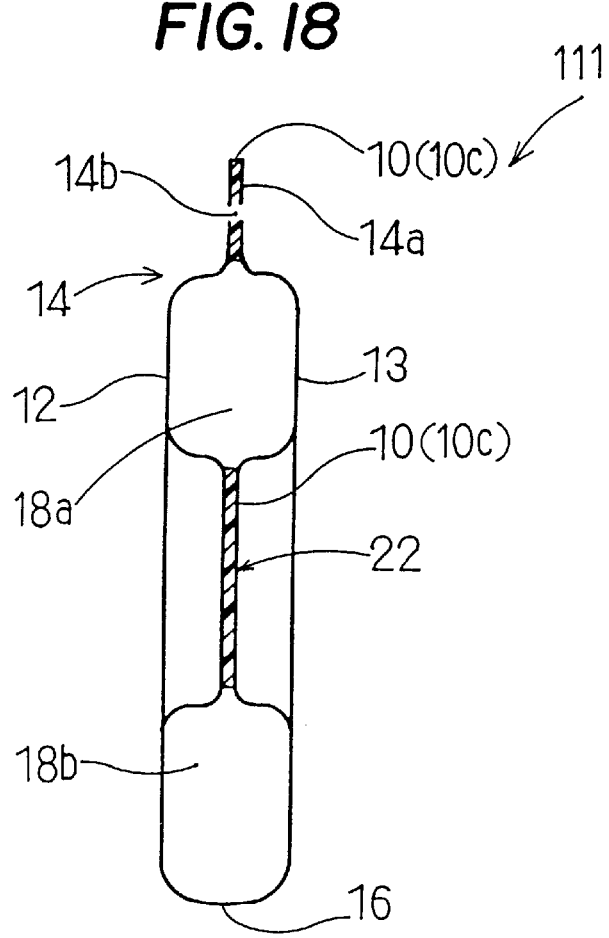
FIG. 18 is a section corresponding to FIG. 6, but shows another modification of joint means.
Figure 19:
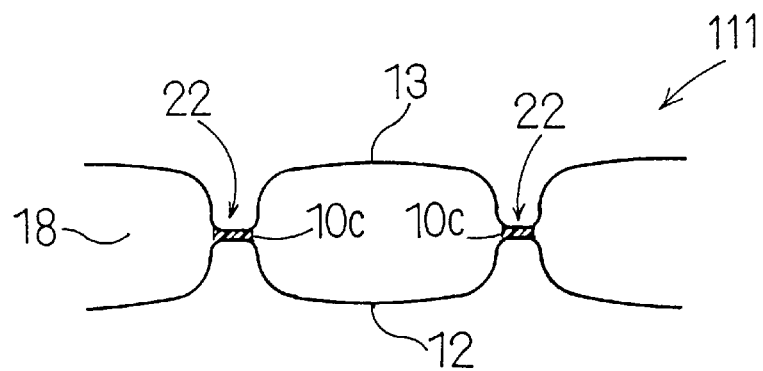
FIG. 19 is a section corresponding to FIG. 7, but shows the same modification of joint means.
Figure 20:
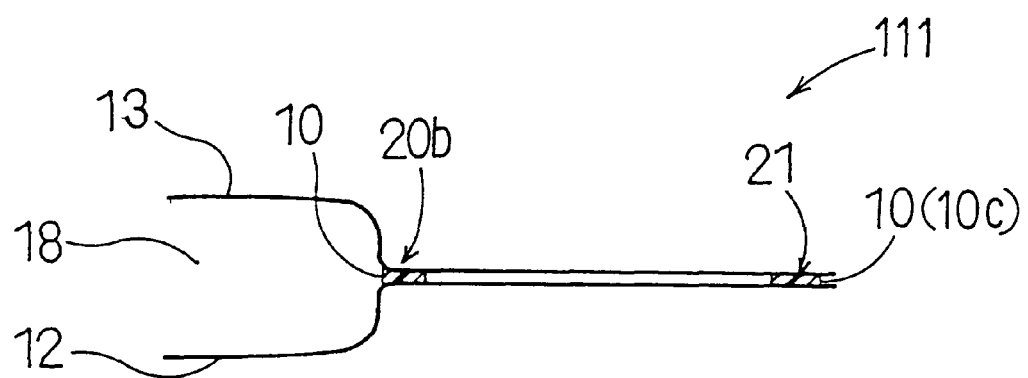
FIG. 20 is a section corresponding to FIG. 8, but shows the same modification of joint means.

Here, the joint means may be exemplified, by, in addition to the stitching thread 10a, employing an adhesive 10c such as a thermoset adhesive or hot melt adhesive of silicone, urethane or epoxy type, or by applying the adhesive to the predetermined peripheral edge to joint the applied portions into the bag shape, as in an air bag 111 shown in FIGS. 18 to 20. As in an air bag 161 shown in FIG. 17, moreover, the inner side wall 12 and the outer side wall 13 may be stitched with the stitching thread l0a by sandwiching an elastic sheet member 10b made of an adhesive layer of silicone tape or butyl rubber tape in between.

The expansion chamber forming joint 20 is comprised of a mounting side joint 20a extending from the upper side 14 to the oblique side 15 including the gas inlet 19, and a projecting side joint 20b located at the rear side 17 and accommodated in a folded state to project at the time of inflation. At the upper side 14 and the oblique side 15 of the mounting side joint 20a, respectively, there are formed a predetermined number of mounting members 14a and 15a having mounting holes 14b and 15b. On the other hand, the rear side 17 of the projecting side joint 20b is folded, when accommodated, together with the lower side 16, and is projected when inflated.

Figure 8:
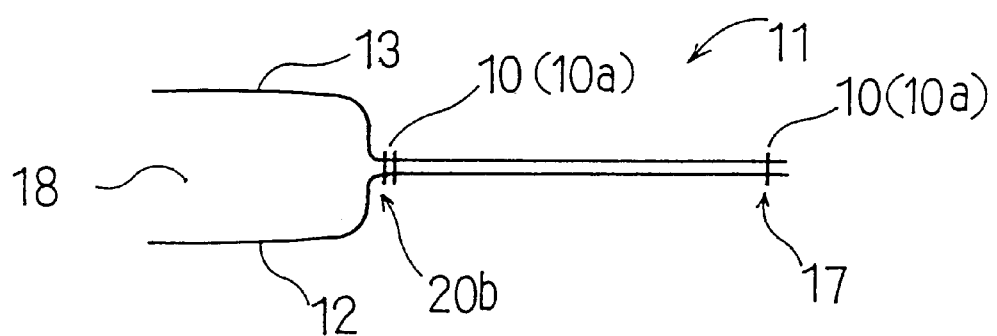
FIG. 8 is an enlarged section taken along line VIII—VIII of FIG. 5.
Figure 13:
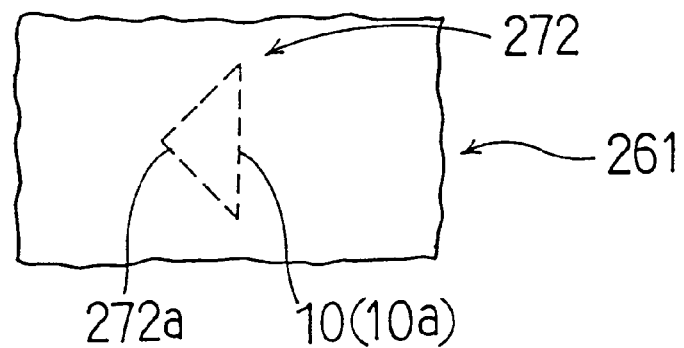
FIG. 13 is a partially enlarged front elevation showing a modification of a tensing joint.
Figure 14:
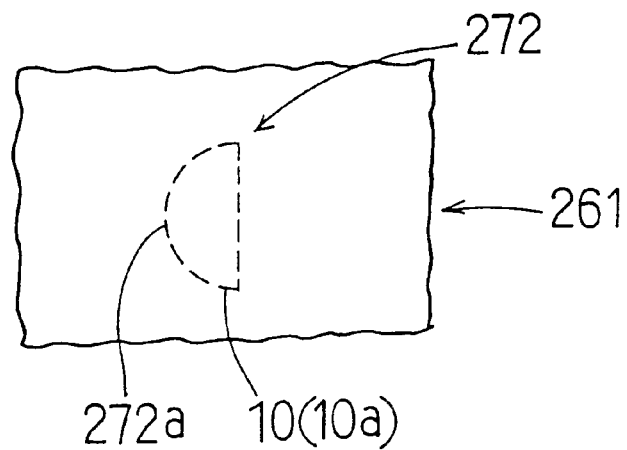
FIG. 14 is a partially enlarged front elevation showing another modification of a tensing joint.
Figure 15:
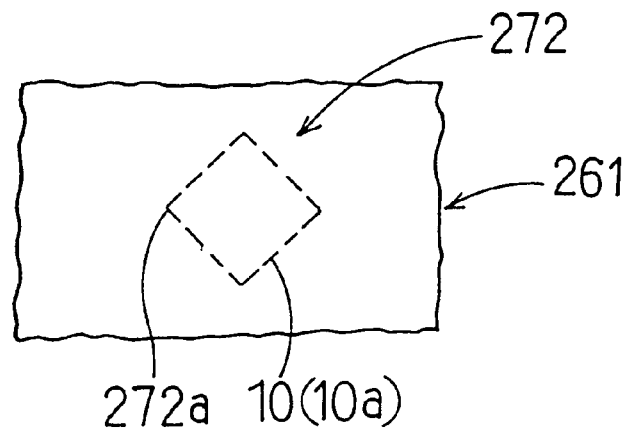
FIG. 15 is a partially enlarged front elevation showing still another modification of a tensing joint.
Figure 16:
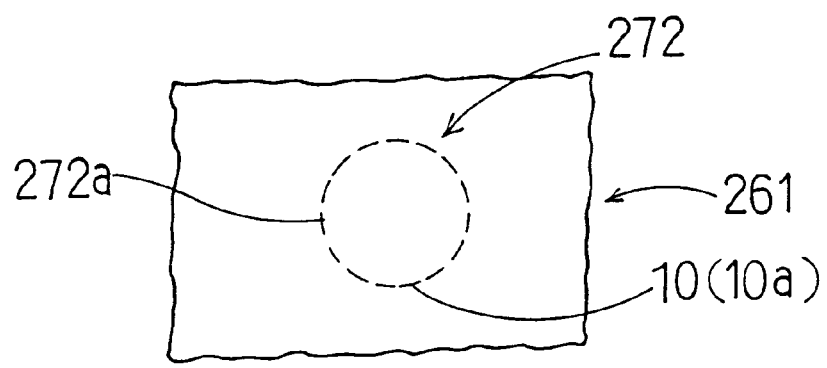
FIG. 16 is a partially enlarged front elevation showing still another modification of a tensing joint.

Here, at the rear side 17 of the air bag 11, there is formed an integrating joint 21 at which the inner side wall 12 and the outer side wall 13 are linearly jointed by the joint means 10. The integrating joint 21 is provided, as shown in FIGS. 5 and 8, not to form the expansion chamber 18 but to integrate the inner side wall 12 and the outer side wall 13 at their rear edges so as to prevent the air bag 11 from fluttering when inflated.

Therefore, the peripheral edge of the expansion chamber 18 of the first embodiment is defined by the crease 9a of the cloth material 9 or the lower side 16, the projecting side joint 20b at the rear edge apart from the gas inlet 19, and the mounting side joint 20a in front of the projecting side joint 20b at the upper edge.

When the mounting side joint 20a is made, the gas inlet 19 is arranged on the extension of the lower side 16. Since the cloth material 9 has flexibility, however, the gas inlet 19 can be arranged on the extension of the oblique side 15, when it is mounted on the peripheral edge of the opening W, by bending it easily.

When the joints 20 and 21 are to be made by folding the cloth material 9 along the crease 9a, moreover, later-described tensing joints 22 are also made to form the expansion chamber 18. The mounting holes 14b and 15b of the individual mounting members 14 and 15 may be formed after the mounting side joint 20a is made.

Moreover, the tensing joints 22 for forming a tension line L—L in the air bag 11 being inflated are provided by the stitching thread 10a, as shown in FIGS. 4 to 7, with bulges 22a bulging toward the gas inlet 19 and recesses 22b at the side apart from the gas inlet 19, and are made by jointing the inner side wall 12 and the outer side wall 13. In the case of the embodiment, the four joints 22 are so arranged in juxtaposition along the tension line L—L at a vertical middle portion in the expansion chamber 18 as to form spaces 18a and 18b for passing the inflating gas vertically within the air bag 11. Moreover, the individual joints 22 of the embodiment are arranged across the tension line L—L, and are stitched into a loop closing the inner side wall 12 and the outer side wall 13. Here, the individual joints 22 may be doubly stitched with the stitching thread 10a, as in an air bag 211 shown in FIG. 10, so as to increase their stitched strength.

Figure 2:
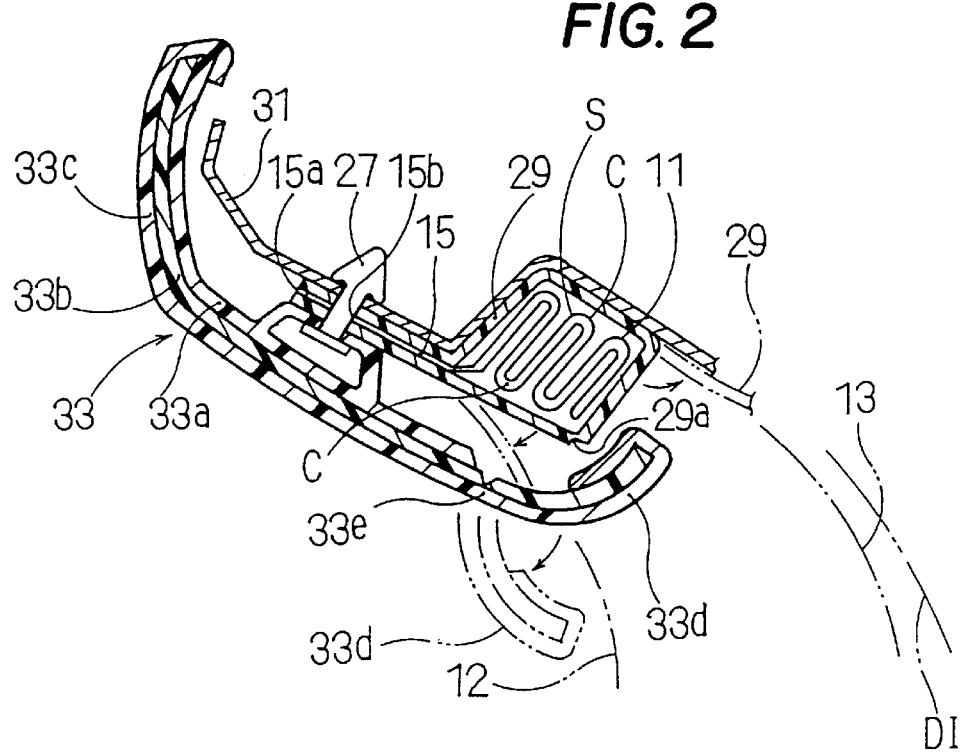
FIG. 2 is an enlarged section showing an essential portion taken along line II—II of FIG. 1.
Figure 3:
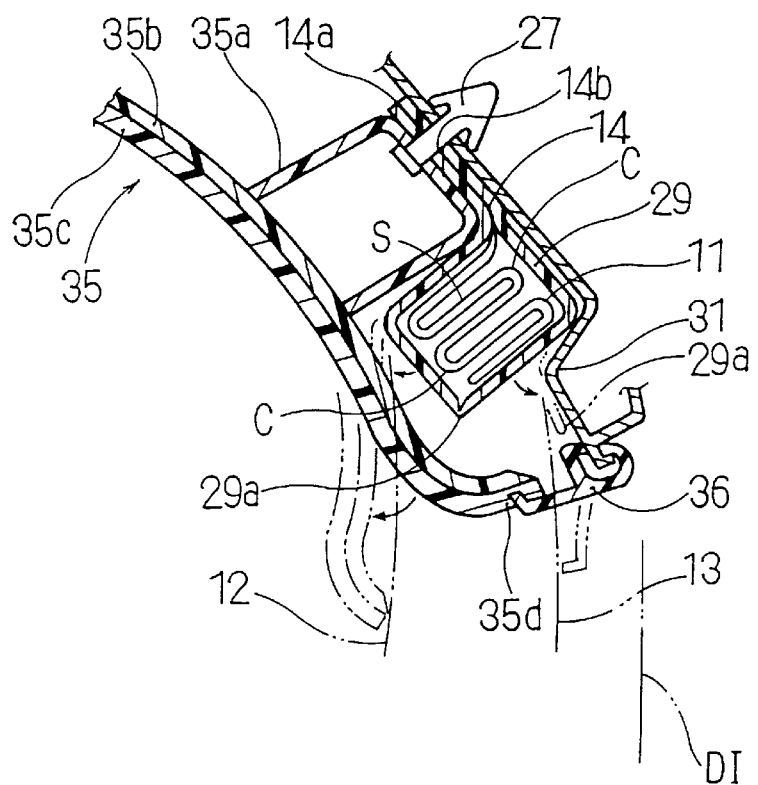
FIG. 3 is an enlarged section showing an essential portion taken along line III—III of FIG. 1.

The air bag 11 is accommodated, as shown in FIGS. 2 and 3, by folding it so as to form repeated crests and valleys sequentially with respect to the peripheral edge of the opening W, and is covered at the side of the front pillar FP with a garnish 33, and is covered at the side of the roof side rail RR with a roof interior member 35. Here, the overlapping faces S of the air bag 11 are folded generally at a right angle with respect to a door inner face DI.

The garnish 33 is comprised, as shown in FIGS. 1 and 2, of a mounting root 33a, a base 33b and a surface 33c made of a synthetic resin such as an ABS resin or polypropylene, and is further comprised of a door portion 33d which is arranged with an integral hinge 33e so that it is pushed and opened by the air bag 11 at the time the air bag 11 is inflated. The garnish 33 is fastened on a body 31 by means of clips 27 or bolts. Here, these clips 27 or the like act to fasten the air bag 11 onto the body 31 by inserting them together with a later-described mounting belt 29 into the predetermined mounting holes 15b of the air bag 11.

The roof interior member 35 is comprised, as shown in FIGS. 1 and 3, of a mounting root 35a, a base 35b and a surface 35c made of a synthetic resin such as urethane or polypropylene, and is fastened on the body 31 by clips 27 or bolts such that its leading end 35b is retained on a door trim 36 jointed to the body 31. When the air bag 11 is inflated, moreover, the leading end 35d is pushed by the air bag 11 out of engagement with the door trim 36.

The mounting belt 29 for wrapping the folded air bag 11 is provided with a portion 29a which is made so thin as to be broken when the air bag 11 is inflated, and is fastened together with the air bag 11 by the clips 27 or bolts for fastening the air bag 11 to the body 31. Here, the air bag 11, as shown in FIGS. 2 and 3, is actually folded into a bellows shape having more creases C, like the air bag 11 shown in FIG. 5.

At the front end of the air bag 11, on the other hand, the cylindrical gas inlet 19 is disposed over the inflator 24, and the cylindrical gas inlet 19 is mounted on the body 31 while being pushed onto the outer circumference of the inflator 24 by a mounting bracket 25 mounted on the body 31.

The inflator 24 is constructed to include a generally cylindrical body 24a having at its upper end a gas exit 24b for discharging the inflating gas, and a not-shown cylindrical diffuser made of a sheet metal and covering the circumference of the gas exit 24b. The inflator 24 is mounted on the body 31 by fitting the gas inlet 19 of the air bag 11 around the diffuser, and by using the mounting bracket 25 for pushing the gas inlet 19 onto the outer circumference of the diffuser. Here, the mounting side joint 20a around the gas inlet 19 is folded around the diffuser.

Figure 21:
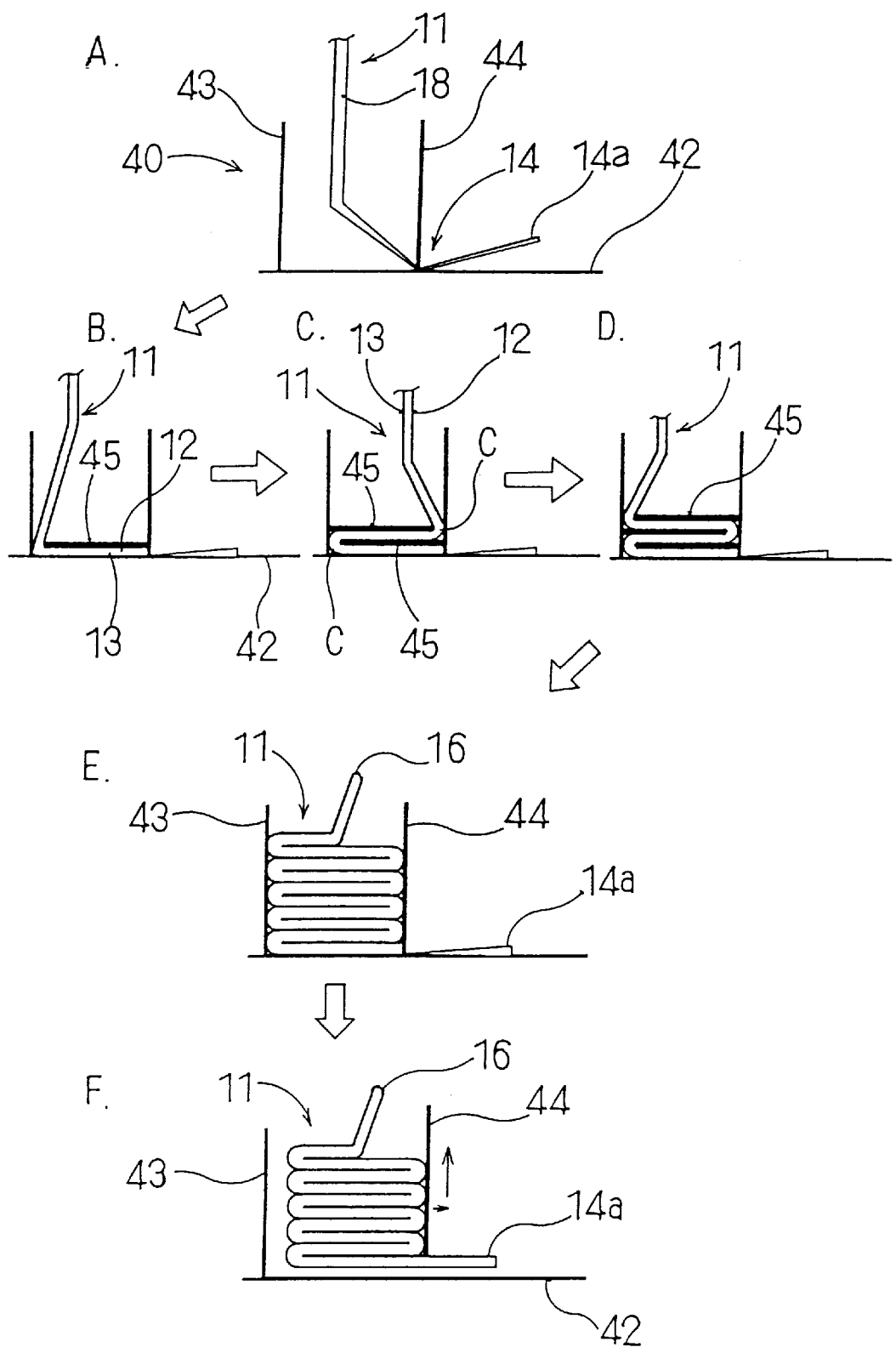
FIG. 21 presents diagrams for explaining a process for folding the air bag of the first embodiment.
Figure 22:
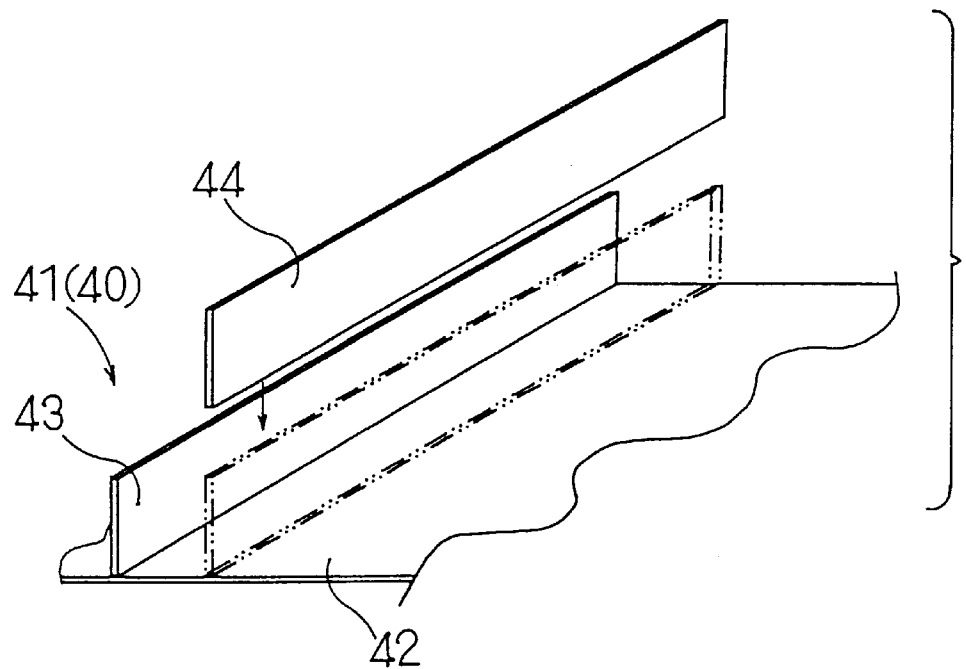
FIG. 22 is a perspective view showing the body of a folding jig to be used in the process for folding the air bag of the same embodiment.

Moreover, in a folding direction (i.e., an overlapping direction) Z for folding the air bag 11 into the bellows shape, the air bag 11 is folded toward the upper side 14 at a right angle by forming the creases C in parallel with the upper side 14, as shown in FIG. 5. In the case of the embodiment, the air bag 11 is folded by employing a folding jig 40, as shown in FIGS. 21 and 22. This folding jig 40 is comprised of a body 41 and a predetermined number of folding plate 45 having a width slightly smaller than the folding width B of air bags 11. The body 41 is constructed by arranging a vertical wall 43 on the upper face of a base plate 42, and by arranging a holding wall 44 at such a position in parallel with the vertical wall 43 as is generally spaced by the folding width B (as shown in FIG. 5).

In a process for folding the air bag 11 by employing the folding jig 40, as shown at A in FIG. 21, the expansion chamber 18 is arranged at the side of the vertical wall 43, and the root portion of the mounting member 14a of the upper side 14 is arranged under the expansion chamber 18. Then, the holding wall 44 is moved down so as to hold the root portion of each mounting member 14a.

After this, as shown at B in FIG. 21, the outer side wall 13 of the expansion chamber 18 is held from the inner side wall 12 between the vertical wall 43 and the holding wall 44 by the folding plate 45 so as to abut against the base plate 42.

Then, the air bag 11 is folded to form a crest, as shown at C in FIG. 21, and the second folding plate 45 is arranged on the outer side wall 13 to fold the air bag 11 to form a valley. From now on, the folding plates 45 are sequentially inserted to repeat the crest and valley folds, as shown at D in FIG. 21.

Figure 23:
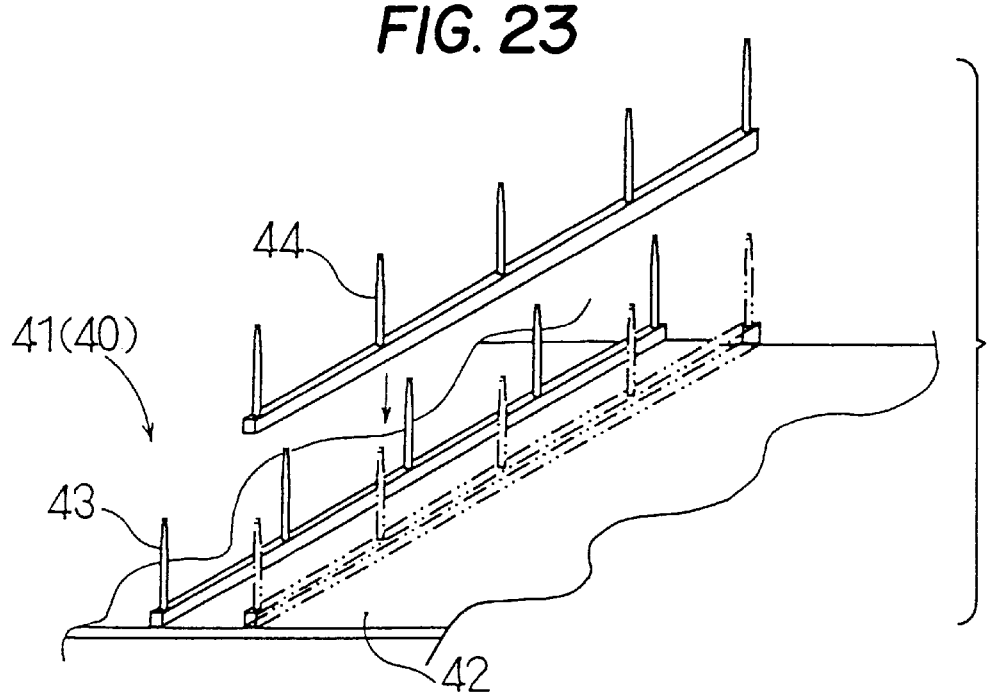
FIG. 23 is a perspective view showing a modification of the folding jig.

After this, when the air bag 11 is folded to the vicinity of the lower side 16, all the folding plates 45 are removed, as shown at E in FIG. 21. As shown at F in FIG. 21, moreover, the holding wall 44 may be moved up to remove the folded air bag 11 from the holding jig 40. Here, the folding jig 40 should not be limited to plate shapes, but may also be exemplified by the comb-shaped vertical walls 43 and holding walls 44, as shown in FIG. 23.

After the air bag 11 is thus folded up, the mounting member 15a, if it is folded during folding, may be pulled out. Then, the mounting members 14a and 15a of the air bag 11 may be locally wrapped with the mounting belts 29, and the inflator 24 may be assembled with the gas inlet 19 by employing the mounting bracket 25. Then, the mounting belts 29 and the mounting bracket 25 may be mounted together with the garnish 33 and the roof interior member 35 on the body 31 by employing the clips 27 or the like thereby to mount the air bag device M1 on the vehicle.

Here, the air bag 11 can be easily mounted on the peripheral edge of the opening W, because it is not inflated such as not to form a tension line L—L.

Into the mounting holes 14b at the rear end of the air bag 11, on the other hand, there are inserted bolts 38 without employing the mounting belts 29, so that the air bag 11 is mounted at its rear end on the body 31.

When the inflating gas is discharged from the gas exit 24b of the inflator 24 after the air bag device M1 is mounted, the air bag 11 breaks the portions 29a of the individual mounting belts 29 to push and open the door portion 33d of the garnish 33, and the leading end 35d of the roof interior member 35, so that the air bag 11 expands to close the opening W, as shown in FIG. 4.

In the air bag 11 of the first embodiment, the individual tensing joints 22 are arranged generally at the vertically middle portions, and equipped over and under these middle portions with the spaces 18a and 18b for guiding the expanding gas so as to integrate the inflated expansion chambers 18 into one single entity. Without providing any pipe for guiding the expanding gas, therefore, this gas smoothly flows through the upper and lower spaces 18a and 18b into the portions between the joints 22. Thus, the complete lack of need for any pipe enables a reduction in the size and weight of the device M1 accordingly.

Moreover, the air bag 11 can be inflated (or expanded) for a short time because the inflating gas flows through the upper and lower spaces 18a and 18b of the air bag 11.

It is natural that at the completion of the inflation (or at the end of the expansion), the portions between the joints 22 are inflated to form the tension line L—L to smoothly restrain the head of a passenger.

At the completion of the inflation, moreover, an inflated portion is longitudinally formed under the air bag 11 by the lower space 18b so that the air bag 11 can be further prevented from bending in order to enhance the restraint on the passenger.

In the air bag 11 of the first embodiment, moreover, the tensing individual joints at the time of expansion are equipped with the curved bulges 22a to bulge toward the gas inlet 19, and are juxtaposed longitudinally vis-a-vis the vehicle at its vertically middle portions.

Specifically, the individual joints 22 are not extended to the upper edge or to the lower edge of the air bag 11 so that the inflating gas smoothly flows over and under the joints 22 to the portions separate from the gas inlet 19. Moreover, the individual joints 22 are provided with the curved bulges 22a bulging toward the gas inlet 19 so that the inflating gas is vertically separated to smoothly flow to the portions separate from the gas inlet 19, even if the air bag impinges upon the joint portions 22. As a result, the pressure loss of the inflating gas can be suppressed so as to employ the inflator 24 of a low output.

In the air bag 11 of the first embodiment, moreover, there are formed in the individual joints 22 at the opposite sides of the gas inlet 19 the recesses 22b which are recessed toward the gas inlet 19. Unlike joints 272 having only bulges 272a, as shown in FIGS. 13 to 16, the inner side wall 12 and the outer side wall 13 between the adjoining joints 22 are vertically pulled to increase the tension in the juxtaposition direction of the joints 22; i.e., the tension of the tension line L—L, so that the restraint of the air bag 11 can be enhanced. These effects can be achieved even for an air bag 311 which is stitched in a curved line with the stitching thread 10a to juxtapose joints 322 having bulges 322a and recesses 322b, as shown in FIG. 11. Even an air bag 261 having the joints 272, as shown in FIGS. 13 to 16, can suppress the pressure loss of the expanding gas because it has the bulges 272a bulging toward the gas inlet 19.

These tensing joints 22, 272 and 322 should not be limited to the shown ones but may be enabled to form the tension line L—L by forming them into short linear or arcuate shapes, and by jointing the inner side wall 12 and the outer side wall 13 in the expansion chamber 18 with the joint means 10 such as the stitching thread 10a. Here, when the individual tensing joints 22, 272 and 322 are made linear, they may be so formed as desired to intersect the folding direction Z of the air bag 11, in order that the stitching thread 10a or the like may not be overlapped, while allowing these joints to be folded compactly.

In the air bag 11 of the first embodiment, on the other hand, the inner side wall 12 and the outer side wall 13 are stitched at each joint 22 into a closed loop. Unlike the linearly stitched air bag 311 of FIG. 11, therefore, the stress concentration, as might otherwise act upon the inner side wall 12 and the outer side wall 13 at the time of expansion, can be suppressed at the end portions of the joints 22 thereby to improve the respective tensile strengths of the individual joints 22. This effect per se can naturally be achieved from the joints 272, as shown in FIGS. 13 to 16. It is especially desired that the joints 272 be stitched into curved loops having no sharp corner.

Here, the first embodiment is exemplified by the joints 22 which appear as crescent shaped in the front view. However, similar effects to those of the air bag 11 of the first embodiment can be achieved, also, from an air bag 361 having the joints 372 which are formed by stitching the bulges 372a and the recesses 372b into loop shapes with the stitching thread 10a, as shown in FIG. 12.

In the air bag 11 of the first embodiment, on the other hand, both the joint 20 for forming the expansion chamber of the peripheral edge and the joints 22, as arranged in the middle portions of the air bag 11 for establishing tension, are formed by stitching the inner side wall 12 and the outer side wall 13 with the stitching thread 10a. As a result, the tension that occurs at the time of expansion can be dispersed between the expansion chamber forming joint 20 and the individual tensing joints 22, in order to enhance the strengths of the joints 20 and 22.

As in the air bag 161 shown in FIG. 17, the joints 20 and 22 for forming the expansion chamber and establishing the tension are formed by stitching the inner side wall 12 and the outer side wall 13 with the stitching thread l0a of polyester, while sandwiching in between the flexible sheet member 10b having an elasticity and made of a silicone tape, a butyl rubber tape or an elastic adhesive layer. In addition to the actions and effects thus far described, the seams can be sealed with the sheet member 10b to suppress the leakage of the expanding gas at the time of expansion of the air bag 161, thereby to increase the force for maintaining the internal pressure of the air bag 161 being inflated.

As in the air bag 111 shown in FIGS. 18 to 20, the expansion chamber forming and tensing joints 20 and 22 are formed by adhering the inner side wall 12 and the outer side wall 13 with the adhesive 10c. Because of the absence of the seams, the leakage of the expanding gas at the time of expanding the air bag 111 can be more restrained than in the case where the joints 20 and 22 are only stitched with the stitching thread 10a, 10a; the result is an increase in the force for maintaining the internal pressure of the air bag 111 being inflated. Here, similar actions and effects could be achieved, too, even if the joints 20 and 22 are formed not by employing the adhesive 10c but by heating the inner side wall 12 and the outer side wall 13 to adhere them by fusion.

Figure 24:
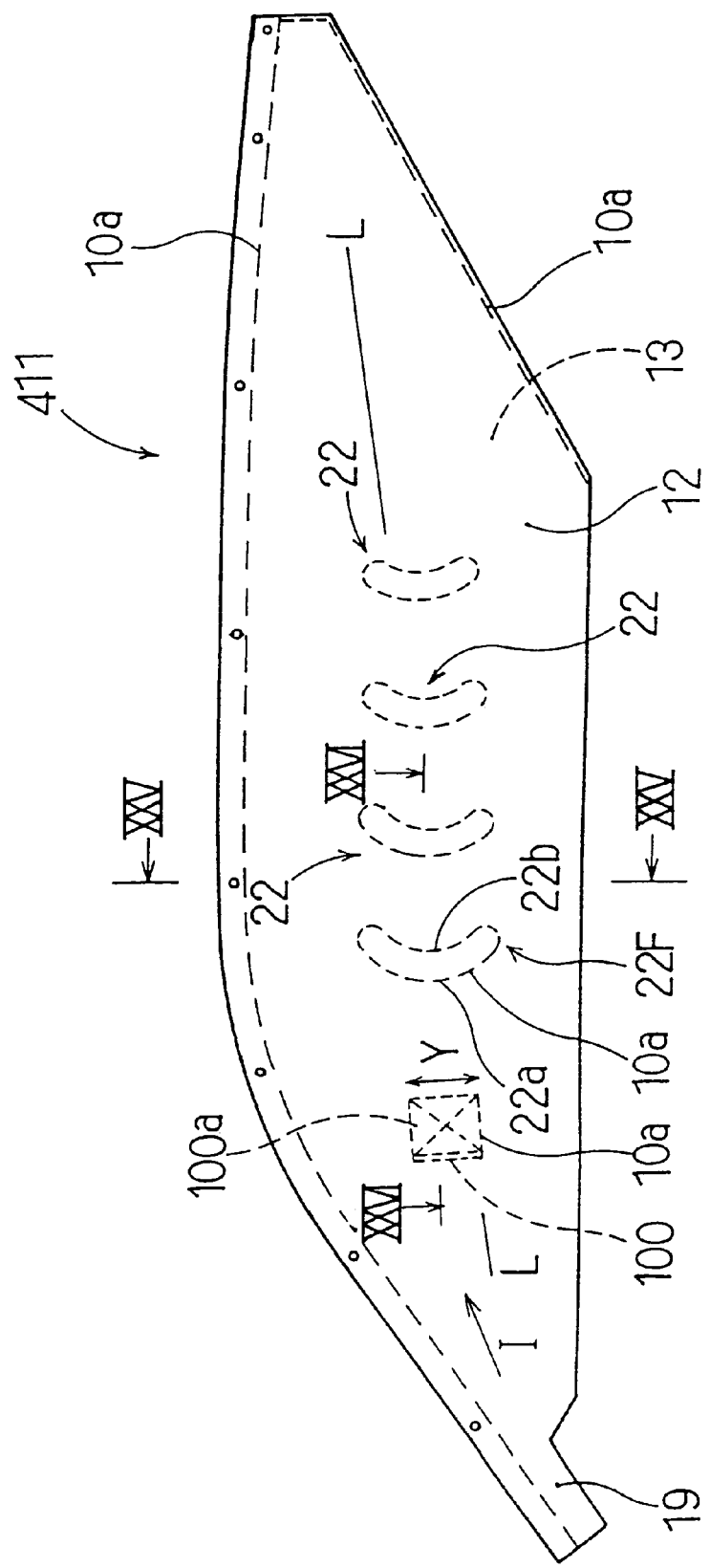
FIG. 24 is a front elevation showing another modification of the air bag when inflated.
Figure 25:
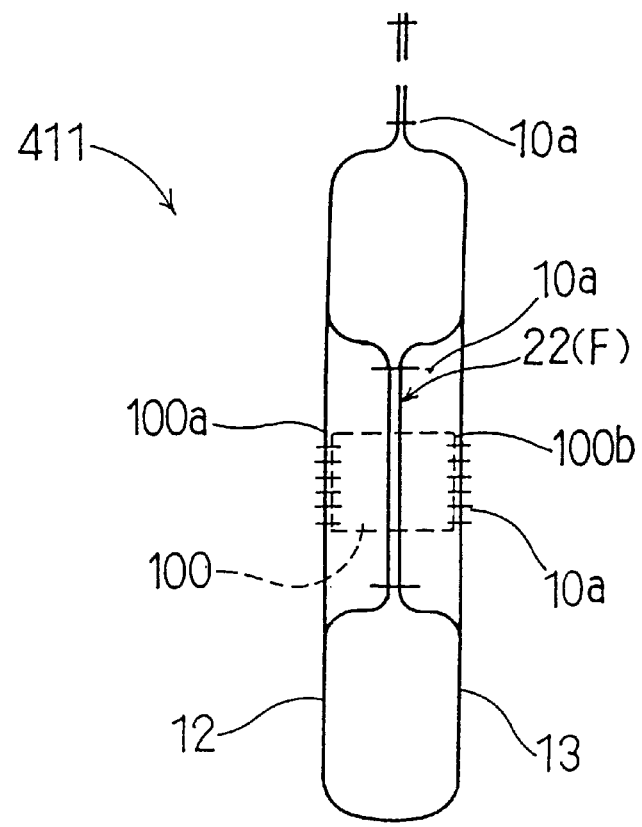
FIG. 25 is a partially enlarged section showing a portion XXV—XXV of FIG. 24.
Figure 26:
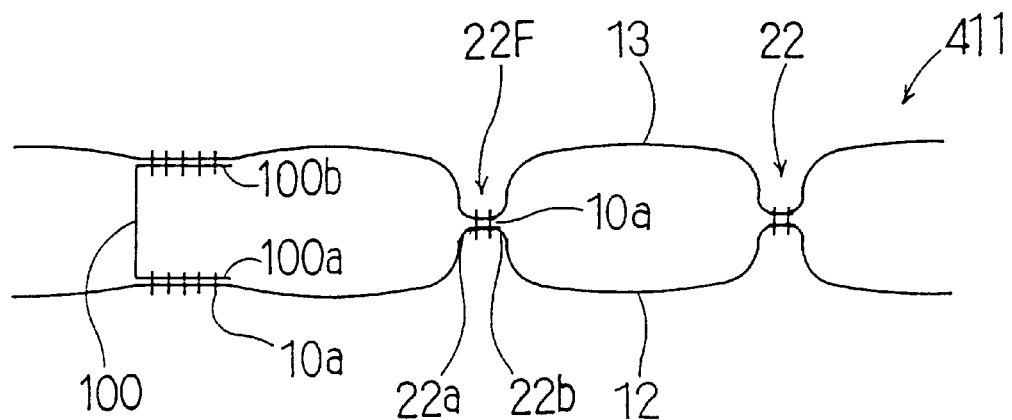
FIG. 26 is a partially enlarged section showing a portion XXVI—XXVI of FIG. 24.

From the standpoint of protecting the tensing joints 22, on the other hand, the air bag may be constructed as indicated at 411 in FIGS. 24 to 26. In this air bag 411, a strap 100 is arranged between the joint 22F at the side of the gas inlet 19 and the gas inlet 19 for jointing the inner side wall 12 and the outer side wall 13 to each other. The strap 100 is made of a band of woven fabric of polyamide and polyester, and is stitched at its two end portions 100a and 100b to the inner peripheries of the inner side wall 12 and the outer side wall 13 with the stitching thread 10a, so that its width direction Y is generally at a right angle with respect to a gas inflow direction I of the expanding gas coming from the gas inlet 19.

Even if the expanding gas flows from the gas inlet 19 into the air bag 411 so that a high tension acts on the inner side wall 12 and the outer side wall 13 at the side of the gas inlet 19, the tension can be offset by the strap 100 to reduce the tension which will act on the joint 22F at the side of the gas inlet 19 in the joints 22 for establishing the tension line L—L at the time of expansion. In other words, the joint 22F at the inflow side of the expanding gas can be protected by the strap 100.

Here, this strap 100 may be so arranged that its width direction Y be generally in parallel with the inflow direction I. However, if, as shown, the width direction Y is generally at a right angle with respect to the inflow direction I of the expanding gas coming from the gas inlet 19, the expanding gas, which might otherwise directly impinge upon the joint 22F, can be reduced in amount in order to better protect joint 22F at the side of the gas inlet 19.

On the other hand, the length of the strap 100 can be suitably set within a range that leads to cause no slackness at the time of expanding the air bag 411, if the strap 100 can be made to protect the joint 22F at the side of the gas inlet 19. Especially, the length of the strap 100 is desirably set so as make the strap 100 play a role in regulating the thickness of the expanded air bag 411 to a predetermined value. In this modification, the arrangement of the strap 100 should not be limited to one location of the air bag 411 of the embodiment, but may be made at a plurality of locations so as to joint the inner side wall 12 and the outer side wall 13.

Moreover, the air bag 11 of the first embodiment is constructed such that neither the portion up to the integrating joint 21 at the back of the projecting side joint 20b nor the entirety of the air bag 11 is expanded. This construction makes it possible to shorten the time period until the completion of the expansion of the air bag 11, as well as to employ an inflator having a low output.

On the other hand, the air bag 11 of the first embodiment is provided with one expansion chamber 18 to be expanded such that the projecting side joints 20b, as folded when accommodated and projected when expanded, and located in the expansion chamber forming joints 20 to be arranged on the peripheral edge for forming the expansion chamber 18, can be reduced in size. Even if there is an overlap of the joint means 10 such as the stitching thread 10a for forming the projecting side joint 20b at the folding time, the air bag 11 can be kept from becoming bulky after the end of its folding operation. Since the tensing joints 22 are disposed generally at the vertical middle portions in the expansion chamber 18 and given small vertical lengths, a contribution can moreover be made to the reduction in size of the folded air bag 11 as folded, while still keeping down its bulkiness, even if the stitching thread 10a or the adhesive 10c for forming the tensing joints 22 overlap when folded.

As a result, the air bag 11 of the first embodiment can be folded compactly. Since the folded overlapping faces S are folded and accommodated in the bellows shape generally at a right angle with respect to the door inner face DI, the air bag 11 can moreover be quickly expanded along the door inner face DI.

Moreover, in the air bag 11 of the first embodiment, the creases 9a of the cloth material 9 at the time of manufacturing the expansion chamber 18 are arranged at the portions to be folded at the folding time, and the creases of the peripheral edge (including the creases 9a of the cloth material 9, the projecting side joint 20b at the rear side separate from the gas inlet 19, and the mounting side joint 20a in front of the projecting side joint 20b at the upper edge) for forming the expansion chamber 18. As a result, the projecting side joint 20b can be further reduced in order to fold the air bag 11 more compactly. Especially in the embodiment, the creases 9a are arranged at the lower edge or the longer portion of the peripheral edge of the expansion chamber 18 so that the folding can be made more compact.

Unless this advantage is to be considered, the air bag 11 may be formed by jointing the two sheets of cloth material for the inner side wall 12 and the outer side wall 13 by a stitching or adhering means.

In the air bag 11 of the first embodiment, on the other hand, of the expansion chamber forming joint 20 to be arranged on the peripheral edge for forming the expansion chamber 18, the projecting side joint 20b is so linearly arranged as to intersect the folding direction, i.e., in the folded overlapping direction Z. As a result, the joint means such as the stitching thread 10a for forming the projecting side joint 20b is displaced to overlap even when the air bag 11 is folded, so that the bulkiness can be suppressed after the end of the folding operation.

In the first embodiment, the integrating joint 21 is also arranged to intersect the folding direction Z, and the stitching thread 10a or the like can be displaced to overlap at the time of folding to prevent bulkiness.

In the first embodiment, still moreover, the projecting side joint 20b is arranged at a position far away rearward from the tensing joint 22B at the rear side so that the projecting side joint 20b and each tensing joint 22 do not overlap, even in the folding direction Z. As a result, the overlap can be absolutely eliminated between the joint means 10, such as the stitching thread 10a for forming the projecting side joint 20b, and the joint means 10, such as the stitching thread 10a for forming the tensing joints 22, thereby to make the folding more compact.

Figure 27:
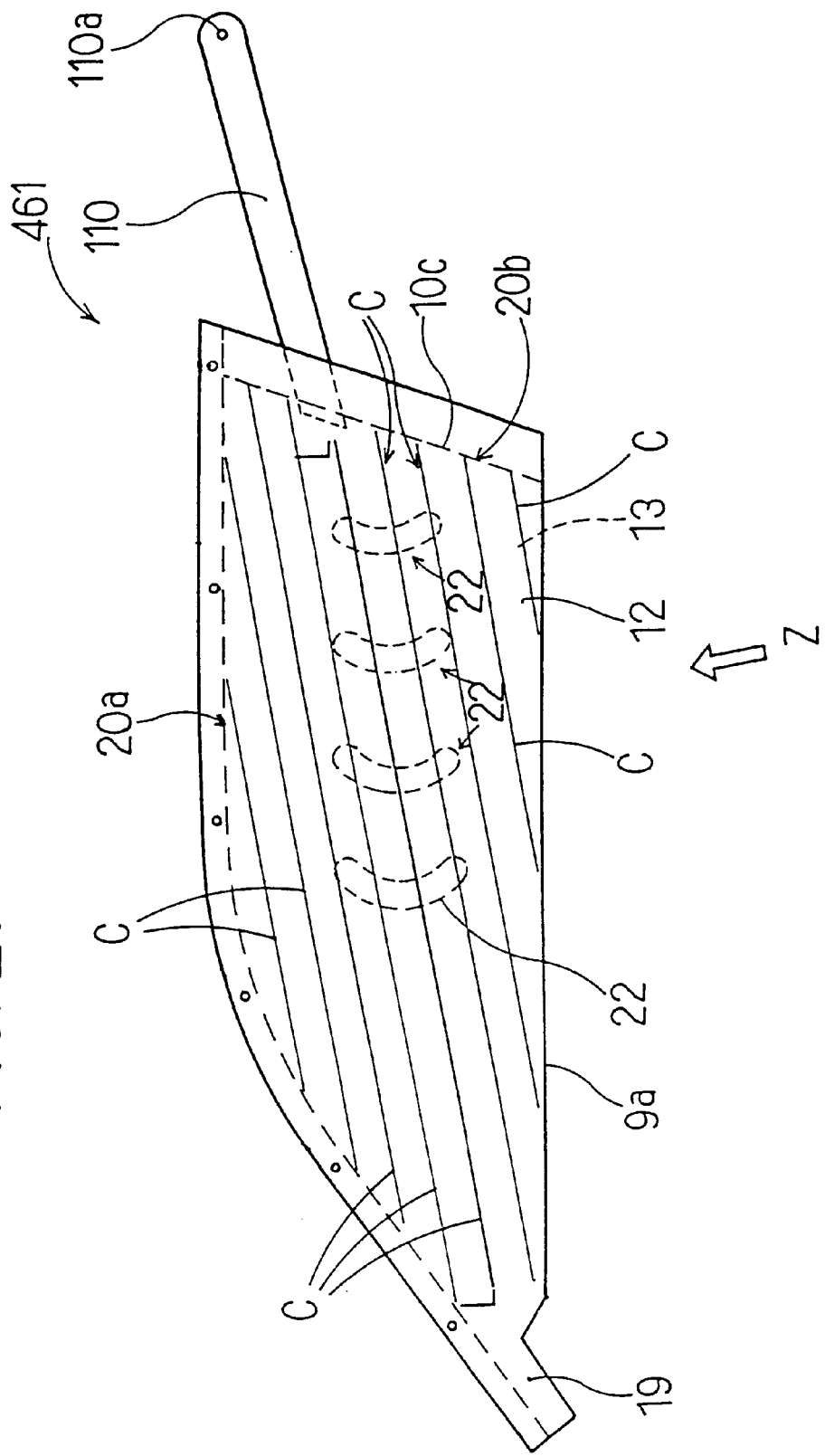
FIG. 27 is a front elevation showing still another modification of the air bag when inflated.

In the first embodiment, moreover, the folding direction Z of the air bag 11 is generally at a right angle with respect to the tension line L—L so that the accuracy of the direction towards which the air bag 11 is to project can be improved at the time of expansion, while also making a contribution to the shortening of the time period until the completion of expansion. Here, the folding direction Z may be oriented to intersect the tension line L—L at a right angle by arranging the creases C along the tension line L—L, as in an air bag 461 shown in FIG. 27.

Still moreover, the air bag 11 of the first embodiment is folded toward the upper side 14 at a right angle with respect to the upper side 14 by forming the creases C in parallel with the upper side 14. If the air bag 11 is folded sequentially with the creases C of crests and valleys from the side of the upper side while holding the mounting members 14a of the upper side 14, its folding operation is facilitated with the straight creases C. Here, the mounting members 15a at the side of the oblique side 15 may be pulled out after the folding operation. The air bag 11 is made so liable to deflect that it can be easily mounted on the peripheral edge of the opening W, because the air bag 11 is yet to be expanded, and thereby no tension line is formed.

Here, the first embodiment is exemplified by the construction in which the integrating joint 21 is formed at the back of the projecting side joint 20b for forming the expansion chamber 18. By omitting the rear side of the projecting side joint 20b at one side of the outer side wall 13 or the inner side wall 12, however, the rear side of the projecting side joint 20b may be formed of one sheet of cloth material of the inner side wall 12 or the outer side wall 13. As in the air bag 461 shown in FIG. 27, alternatively, a band-shaped strap 110 made of a cloth material having mounting holes 110a for inserting the bolts 38 therethrough may be stitched to the projecting side joint 20b. In such a case, it is possible to eliminate the joint means 10 such as the stitching thread 10a for forming the integrating joint 21, one side wall 13 or 12 at the back of the projecting side joint 20b, and the joint means such as the mounting side joint 20a at the back of the projecting side joint 20b. Thus, the air bag 461 can be folded more compactly.

Figure 28:
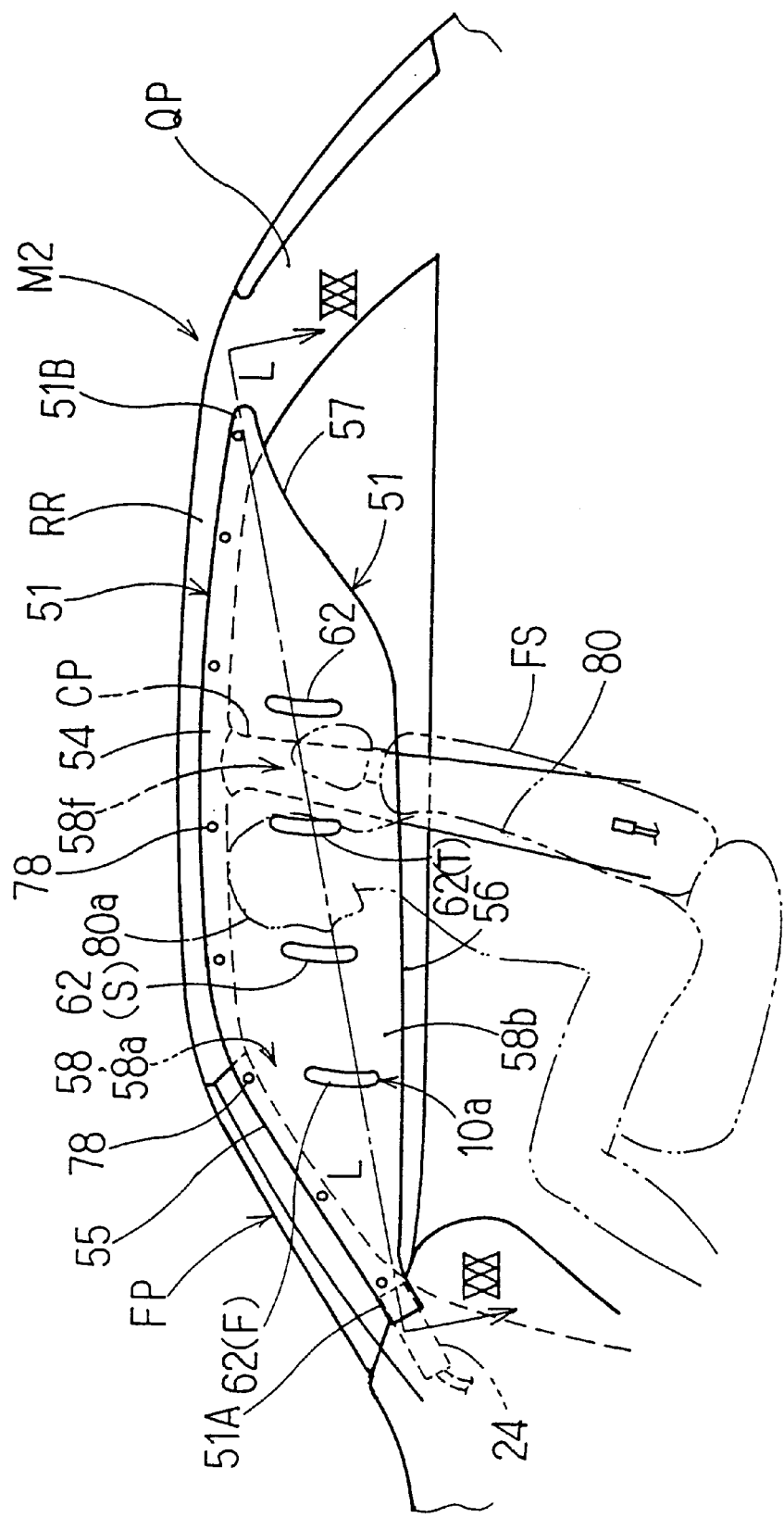
FIG. 28 is a front elevation taken from the inside of a vehicular compartment and shows a side air bar device, when in an activated state, as employing an air bag according to a second embodiment.

An air bag 51 of a second embodiment, as shown in FIG. 28, is so constructed as to be supported a center pillar (or B pillar), so that when the air bag 51 is expanded, by locating the center pillar CP in the expansion area at the time of expansion.

Figure 29:
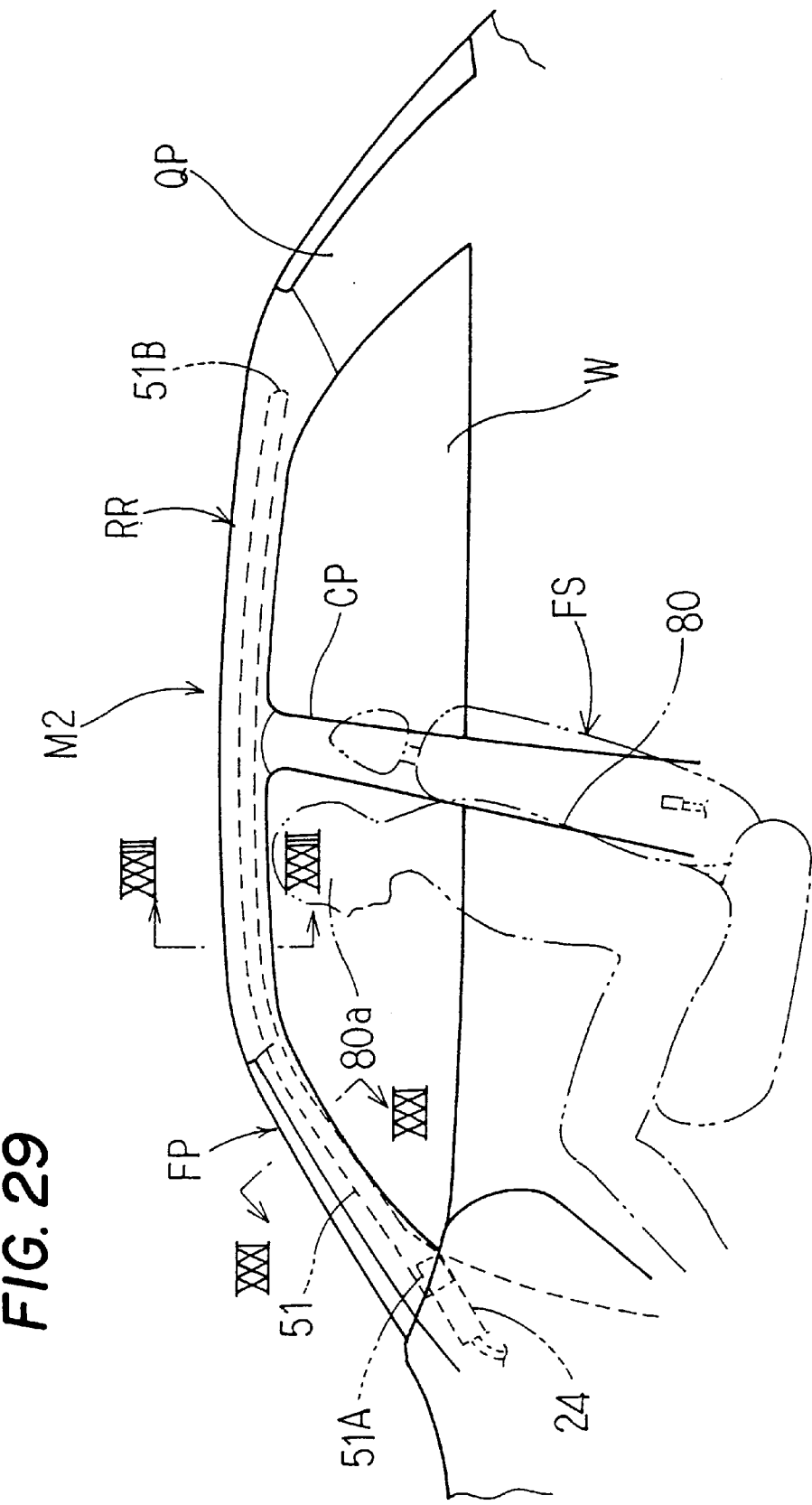
FIG. 29 is a diagram showing the side air bag device employing the air bag of the same embodiment.

This air bag 51 is accommodated in a folded state to extend across the front pillar (or A pillar) FP and the roof side rail RR, as shown in FIG. 29, and a front side fixed point 51A is jointed to the inflator 24 under the front pillar FP. On the other hand, the air bag 51 is set at its rear fixed point 51B on the roof side rail RR near a quarter pillar QP (or C pillar).

Moreover, the air bag 51 is fixed at its oblique side 55 on the compartment side of the front pillar FP by bolts 78, and at its upper side 54 on the compartment side of the roof side rail RR by the bolts 78. In the upper side 54 and the oblique side 55, there are formed the mounting holes for inserting the individual bolts 78 therethrough.

Figure 30:
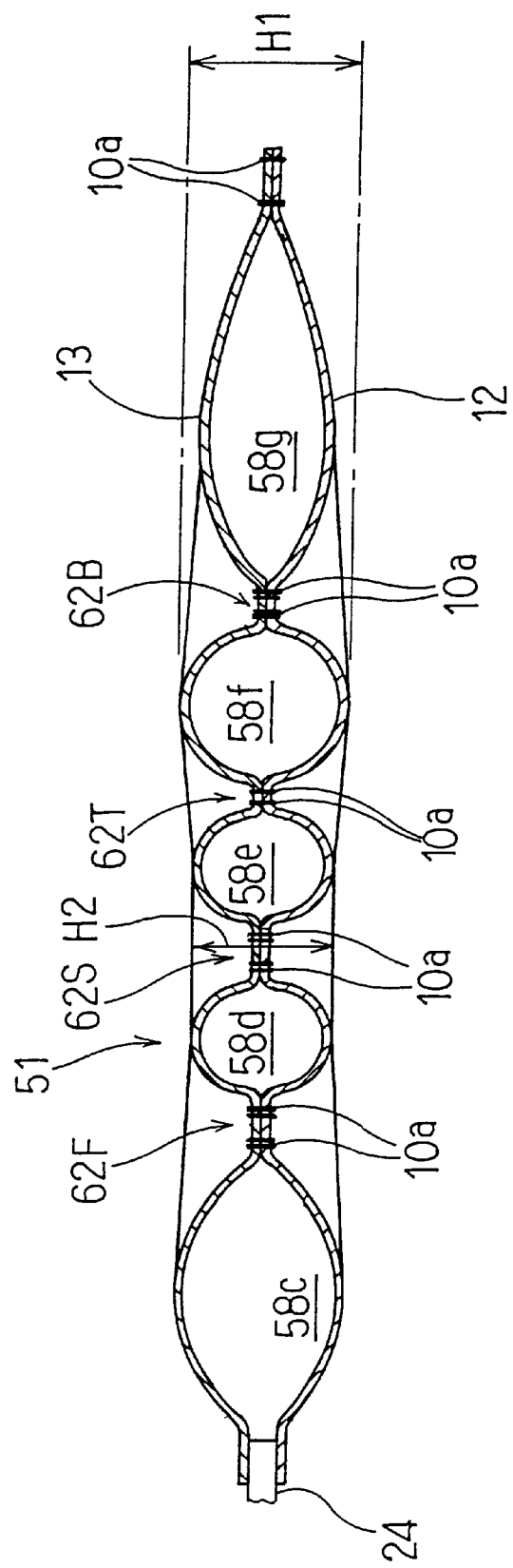
FIG. 30 is a transverse section taken along line XXX—XXX of FIG. 28 and shows the air bag when inflated.

In the air bag 51, moreover, there are juxtaposed along the tension line L—L four joints 62 (62F, 62S, 62T and 62B) for establishing tensions. As shown in FIG. 30, five expansions 58c, 58d, 58e, 58f and 58g are longitudinally formed to cross the tension line L—L individually.

The individual joints 62F, 62S, 62T and 62B are arranged generally at the vertically middle portions of the air bag 51 to form spaces 58a and 58b over and under the vertically midde portions for passing the expanding gas at the time of expansion.

On the other hand, the air bag 51 is manufactured to form the individual joints 62 by folding back one cloth material at a lower side 56, by stitching the portions (i.e., the upper side 54, the oblique side 55 and the rear side 57) excepting the lower side 56 with the stitching thread 10a into a bag shape, and by stitching the predetermined portions of the inner side wall 12 and the outer side wall 13 with the stitching thread 10a.

Moreover, the air bag 51 is so arranged that the expansion 58f at its rear side overlaps the center pillar CP. In this expansion 58f, the spacing between the adjoining joints 62T and 62B is set larger than that between the adjoining joints 62F and 62S or 62S and 62T in the remaining expansions 58d and 58e so that the expansion 58f has a larger thickness H1 than that H2 of the remaining expansions 58d and 58e.

Figure 34:
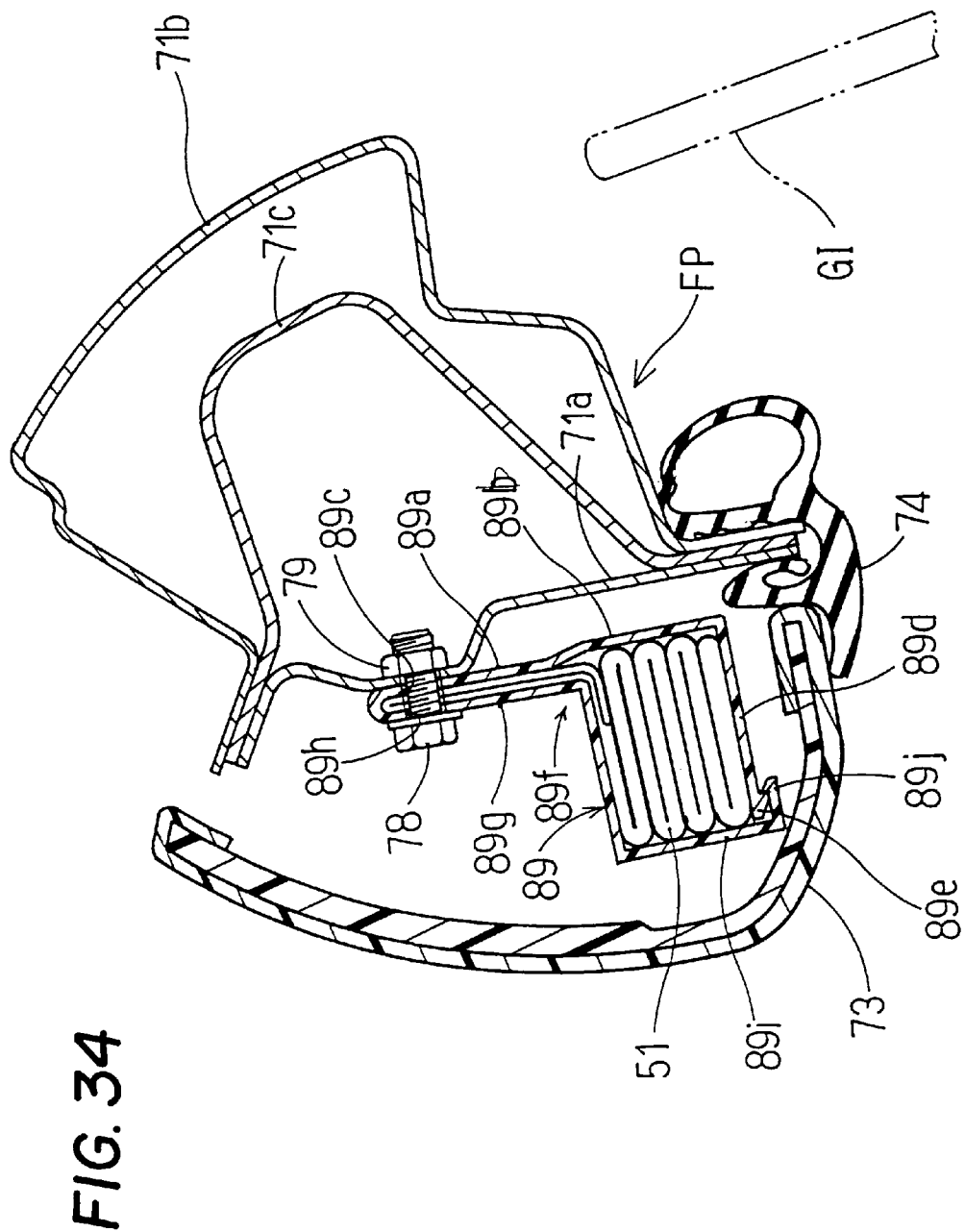
FIG. 34 is a section showing a modification of the case.

On the other hand, the air bag 51 of the second embodiment is accommodated in a folded state in a case 69, which is arranged over the front pillar FP and the roof side rail RR. The air bag 51 is folded, as shown in FIGS. 31 and 34, such that its overlapping faces S are generally at a right angle with respect to a door glass inner face GI.

Figure 31:
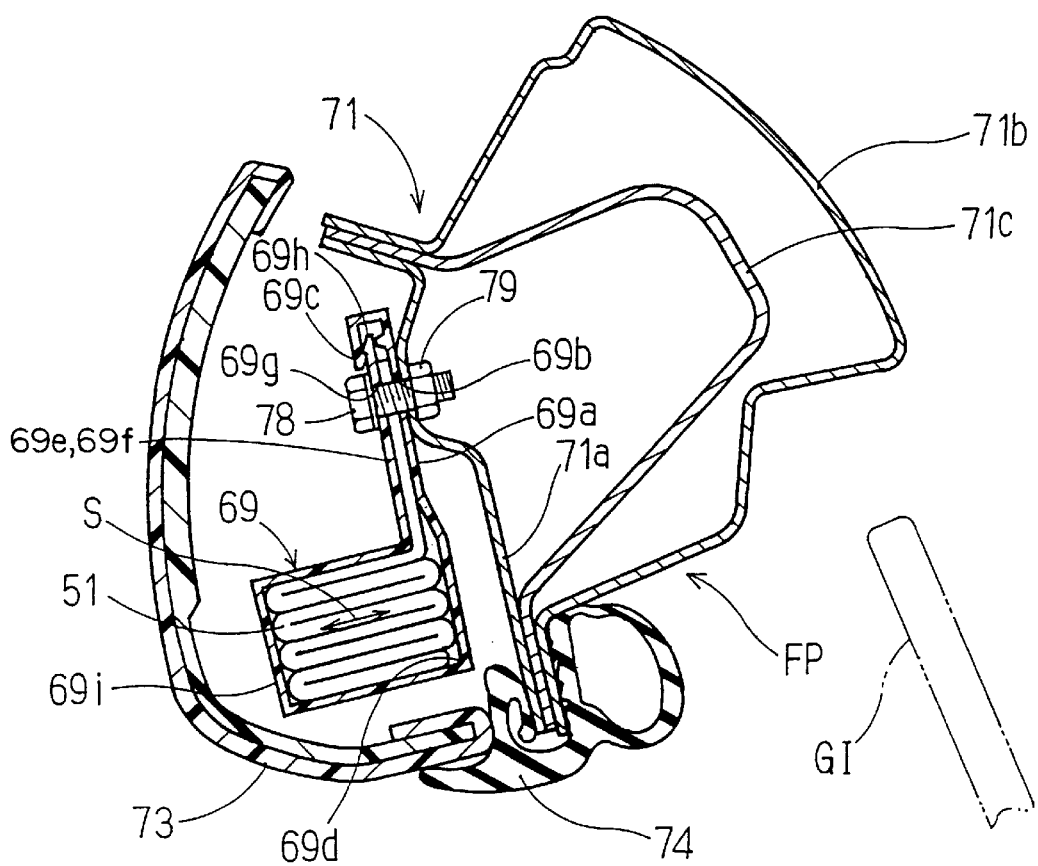
FIG. 31 is a partially enlarged section taken along line XXXI—XXXI of FIG. 29.
Figure 32:
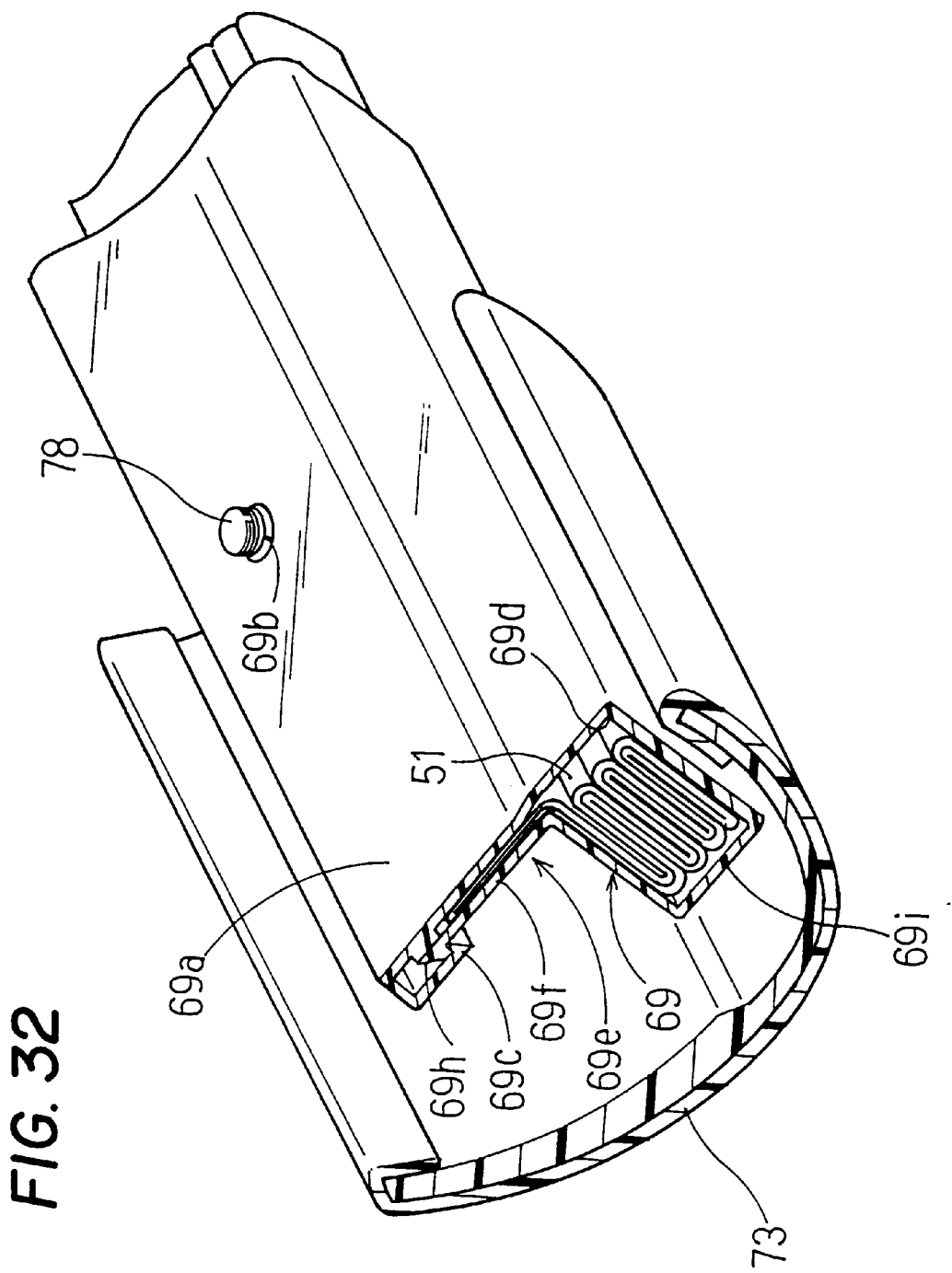
FIG. 32 is a perspective view showing the air bag of the same embodiment when accommodated in a case.
Figure 33:
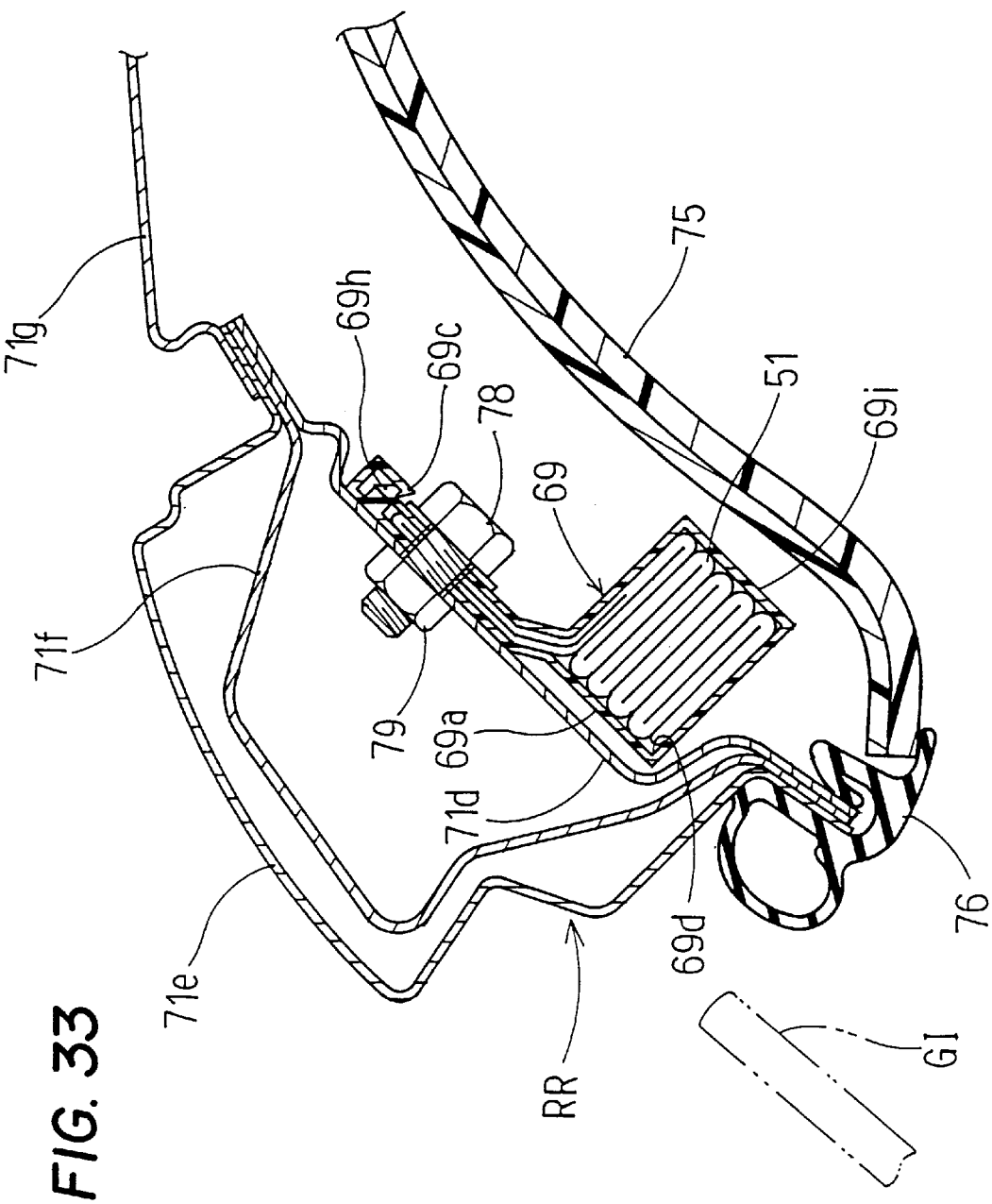
FIG. 33 is a partially enlarged section taken along line XXXIII—XXXIII of FIG. 29.

As shown in FIGS. 31 to 33, the case 69 is accommodated between a front pillar inner panel 71a or a roof side inner panel 71d in a vehicle body 71 and a garnish 73 or a roof interior member 75. The case 69 is made of a synthetic resin such as polypropylene and is constructed to include an outer side wall 69a and an inner side wall 69e. This inner side wall 69e is composed of a flat portion 69f and a lid 69i having a U-shaped section. A V-notch 69d is formed at the jointed portion between the lid 69i and the outer side wall 69a. At the time of expansion of the air bag 51, the V-notch 69d is broken so that the lid 69i is turned on the lids own site, because the lid 69i is hinged to the flat portion 69f of the inside of the compartment to project the air bag 51.

At the outer side wall 69a and the flat portion 69f of the inner side wall 69e, on the other hand, there are formed engaging pawls 69c and 69h which can engage with each other to hold the air bag 51 in the folded state. In the outer side wall 69a and the flat portion 69f of the inner side wall 69e, moreover, there are formed corresponding through holes 69b and 69g so that the case 69 is fixed together with the air bag 51 on the compartment side portions of the front pillar inner panel 71a and the roof side inner panel 71d by means of the bolts 78 extending through the through holes 69b and 69g and nuts 79 fastened on the bolts 78.

Moreover, the air bag 51 is folded such that its folded portion is accommodated in the lid 69i. The air bag 51 is so arranged in the case 69 that its upper side 54 and oblique side 55 can be clamped between the outer side wall 69a and the flat portion 69f of the inner side wall 69e. The folded air bag 51 can be mounted together with the case 69 in the vehicle by bringing the engaging pawls 69c and 69h into engagement with each other, and by fastening the bolts 78 and the nuts 79 to the front pillar inner panel 71a and the roof side inner panel 71d through the through holes 69b and 69g and the air bag mounting holes in the upper side 54 and the oblique side 55.

Here, the garnish 73 and the roof interior member 75 are assembled with the vehicle after the air bag 51 is mounted.

Moreover, reference numeral 71b in FIG. 31 designates a front pillar outer panel, and numeral 71c designates a front pillar reinforcement. In FIG. 33, moreover, reference numeral 71e designates a roof side member, numeral 71f a roof side rail outer reinforcement, and numeral 71g a roof panel.

When the air bag 51 is to be inflated and expanded, it breaks the V-notch 69d of the case 69 to open the lid 69i. Then, the gap between the garnish 73, as closed by a weather strip 74, and the front pillar inner panel 71a, and the gap between the roof interior member 75, as closed by a weather strip 76, and the roof side inner panel 71d, are opened wide to allow the air bag 51 a large expansion.

At this time, the inflating gas is quickly fed from the inflator 24 into the upper and lower spaces 58a and 58b in the peripheral edge of the air bag 51 and further to a plurality of expansions 58c, 58d, 58e, 58f and 58g so that the air bag 51 is expanded within a short time period.

On the other hand, the expansions 58c, 58d, 58e, 58f and 58g, as crossing the tension line L—L jointing the front side fixed point 51A and the rear side fixed point 51B of the air bag 51, can be inflated to establish a high tension reliably on the tension line L—L. Moreover, the longitudinally extending lower space 58b can also be expanded to make the air bag 51 difficult to bend while retaining a high restraining performance on the passenger.

In the air bag 51 of the second embodiment, moreover, the front side fixed point 51A is set near and under the front pillar FP, and the rear side fixed point 51B is set at the roof side rail RR near the quarter pillar QP. As a result, the air bag 51 can be expanded over the entireity of the longitudinal wide range along the compartment side to restrain the head 80a of a passenger 80 reliably, even with changes in the longitudinal position of the seat FS, such as the seat of a driver or a navigator, and in the seated position of the passenger.

In the second embodiment, moreover, the front side fixed point 51A of the air bag 51 is set at the joint of the inflator 24 under the front pillar FP. As compared with the case in which the front side fixed point 51A is set at the compartment side such as the front pillar FP, therefore, the front side fixed point 51A of the air bag 51 can be set at a lower position to protect the head 80a of the passenger 80 over a wider range.

Figure 36:
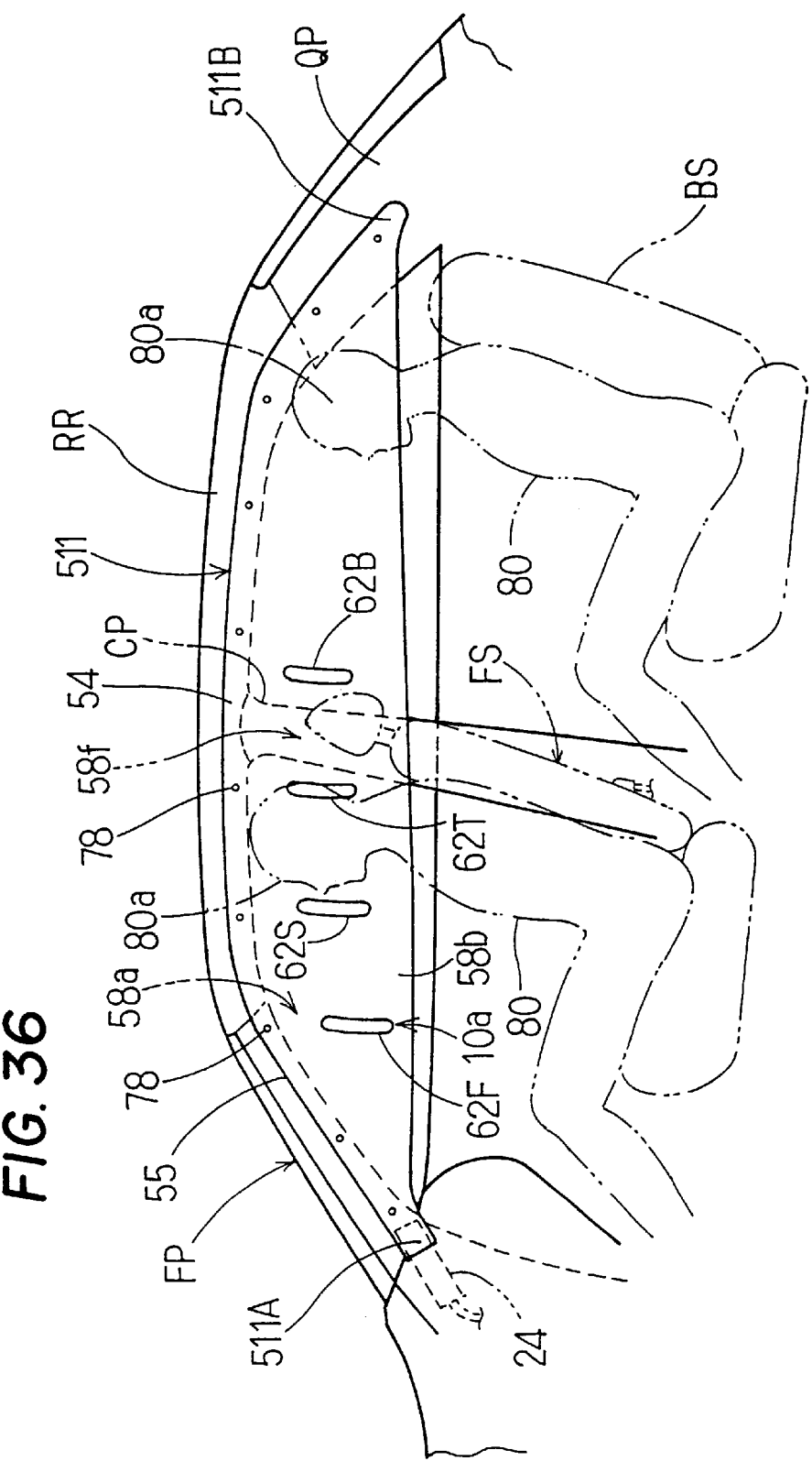
FIG. 36 is a front elevation showing still another modification of the air bag when inflated.

In accordance with this point of view, a rear side fixed point 511B may be set under the quarter pillar QP, as in the air bag 511 shown in FIG. 36. In this modification, the air bag 511 can protect not only the passenger 80 seated on the front seat for the driver or the navigator, but also the head 80a of the passenger 80 seated on a back seat BS.

In the air bag 51 of the second embodiment, on the other hand, the expansion area covers the center pillar CP so that the air bag 51 is supported by the center pillar CP even if it is pushed to the outside of the vehicle by the head 80a of the passenger 80. As a result, the air bag 51 can become even more difficult to bend, in order that it can have a more enhanced performance in terms of restraining the passenger's head 80a.

In the second embodiment, moreover, the thickness H1 of the expansion 58f, as supported by the center pillar CP, of the air bag 51 being expanded is set larger than the thickness H2 of the remaining ordinary expansions 58d and 58e. As a result, the cushioning effect can be enhanced, even with an interference of the air bag 51 with the center pillar CP, in order to better restrain the passenger's head 80a. As compared with the case in which the expansion 58f to be supported by the center pillar CP is made as thick as the remaining ordinary expansions 58d and 58e, the cushioning effect can be retained even under a lower initial pressure in the air bag 51. As a result, it is possible to reduce the output of the inflator 24 and to simplify the sealing method of the air bag 51, thereby resulting in a reduction of the size of a side air bag device M2.

In the second embodiment, on the other hand, in connection with the expansion 58f supported by the center pillar CP, the gap between the adjoining joints 62T and 62B is made larger than the gaps between the adjoining joints 62F and 62S and 62S and 62T of the remaining ordinary expansions 58d and 58e. As a result, the expansion 58f to be supported by the center pillar CP can be easily made thicker than the remaining ordinary expansions 58d and 58e.

Moreover, the air bag 51 of the second embodiment is accommodated in the case 69, and is fixed together with the case 69 onto the front pillar inner panel 71a and the roof side inner panel 71d so that the air bag 51 can be prevented from collapsing by the case 69. With this case 69, the air bag 51 can be prevented, when assembled, from depending out of position, thereby improving its assembly characteristics. With the case 69, moreover, the air bag 51 is not twisted, when assembled, so that the air bag 51 can be reliably accommodated with its overlapping faces S being generally at a right angle with respect to the door glass inner face GI.

Moreover, this case 69 is equipped with the engaging pawls 69c and 69h for engaging with each other to hold the air bag 51 in the folded state so that the air bag 51 can be easily accommodated in the case 69 by bringing the engaging pawls 69c and 69h into and out of engagement. It is quite natural that the engaging pawls 69c and 69h are disposed near the through holes 69b and 69g providing the mounting sides of the inner panels 71a and 71d so that they impart no influence upon the expanding performance of the air bag 51.

Here, a case 89 may be constructed, as shown in FIG. 34, to include an outer side wall 89a outside of the compartment and an inner side wall 89f inside of the compartment. The outer side wall 89a may be comprised of a flat wall 89b having a through hole 89c for admitting the bolt 78 and a bottom 89d bent at a right angle from the front wall 89b. The inner side wall 89f may be composed of a flat wall 89g having a through hole 89h connected to the flat wall 89b for admitting the bolt 78, and a lid 89i having an L-shaped section. Engaging pawls 89e and 89j may be formed to engage with the bottom 89d and the lid 89i to hold the air bag 51 in the folded state. In this case 89, when the air bag 51 is inflated, the engaging pawls 89e and 89j are released from their engagement, so that the bottom 89d is turned and opened on its portion jointed to the flat wall 89b, whereas the lid 89i is also turned and opened on its portion jointed to the flat wall 89g, thereby to project the air bag 51.

Figure 35:
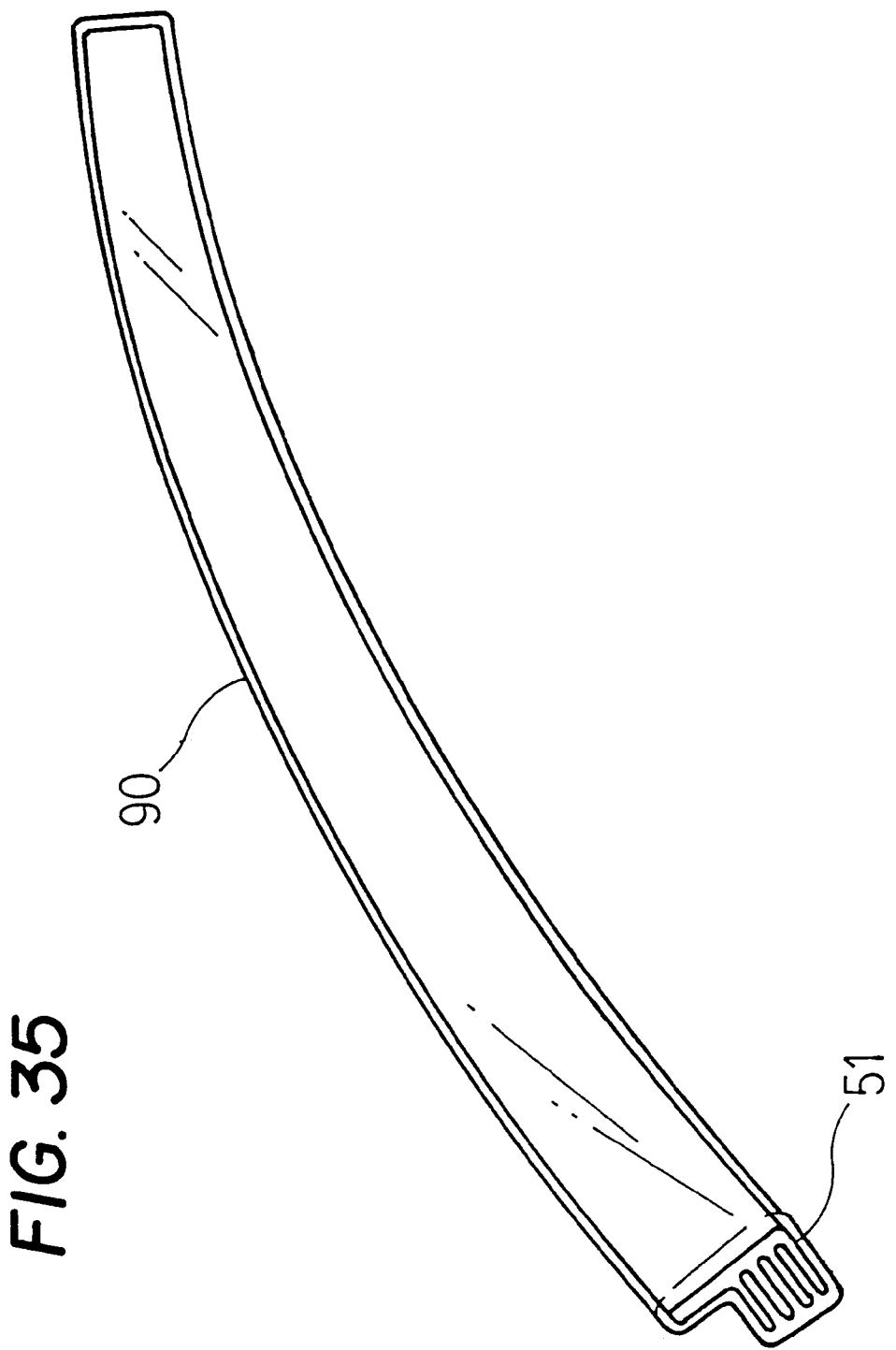
FIG. 35 is a perspective view showing the folded air bag when wrapped.

With the design of preventing the air bag 51 from being collapsed, on the other hand, the air bag 51 may be wrapped with a synthetic resin film such as a polyethylene film 90 having a thickness that allows an easy rupture at the time of expansion of the air bag 51, as shown in FIG. 35, before it is accommodated in the cases 69 and 89.

With this construction, it is possible to prevent the air bag 51 from collapsing, as well as a foreign substance from entering into the air bag 51 being folded. If the wrapping is performed under a vacuum state, the air bag 51 can be folded more compactly to make the following contributions. Specifically, by wrapping the front pillar FP can be made thinner to improve the front view, and the roof side rail RR can also be made thinner to extend the compartment.

Figure 37:
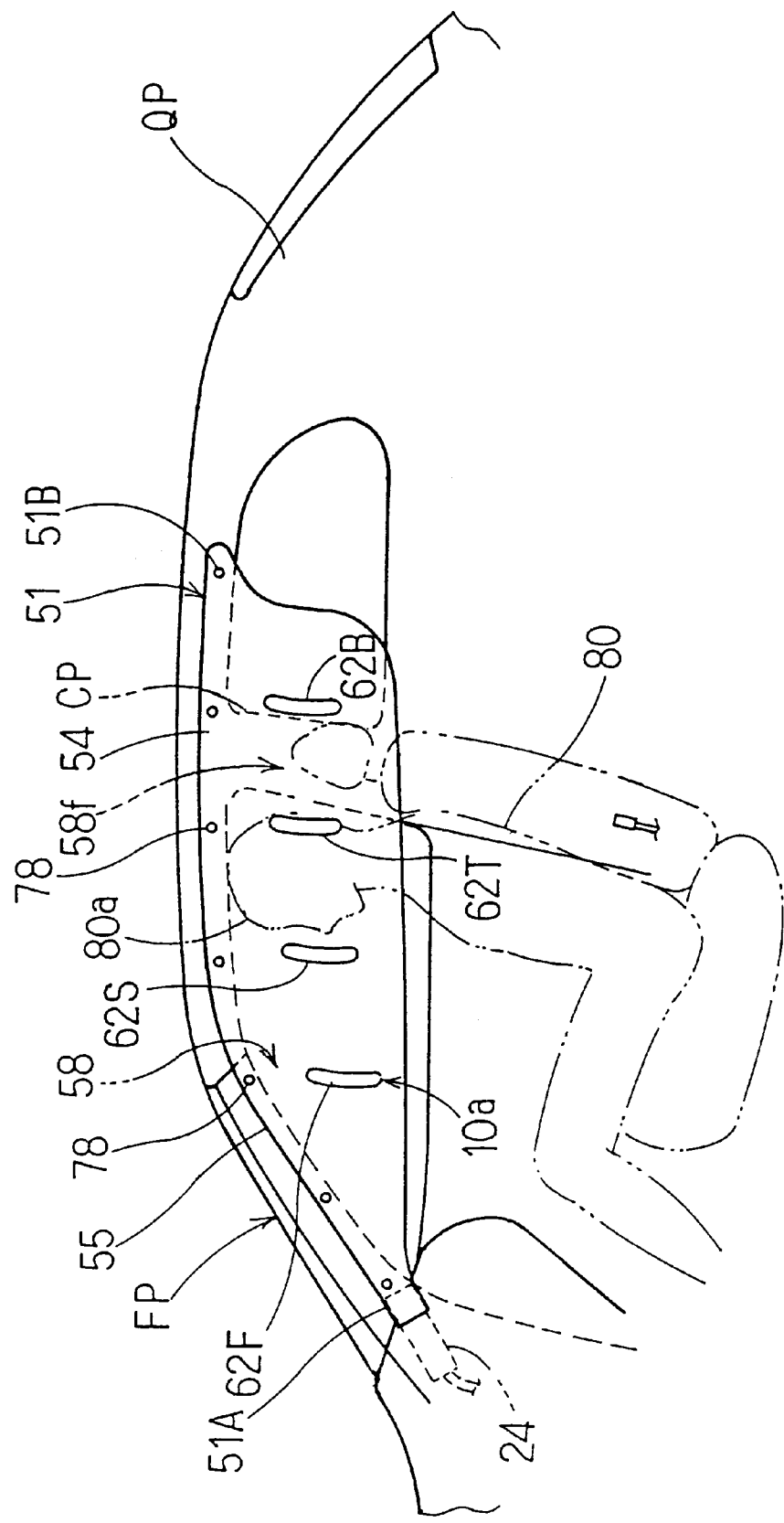
FIG. 37 is a front elevation showing still another modification of the air bag when inflated.
Figure 38:
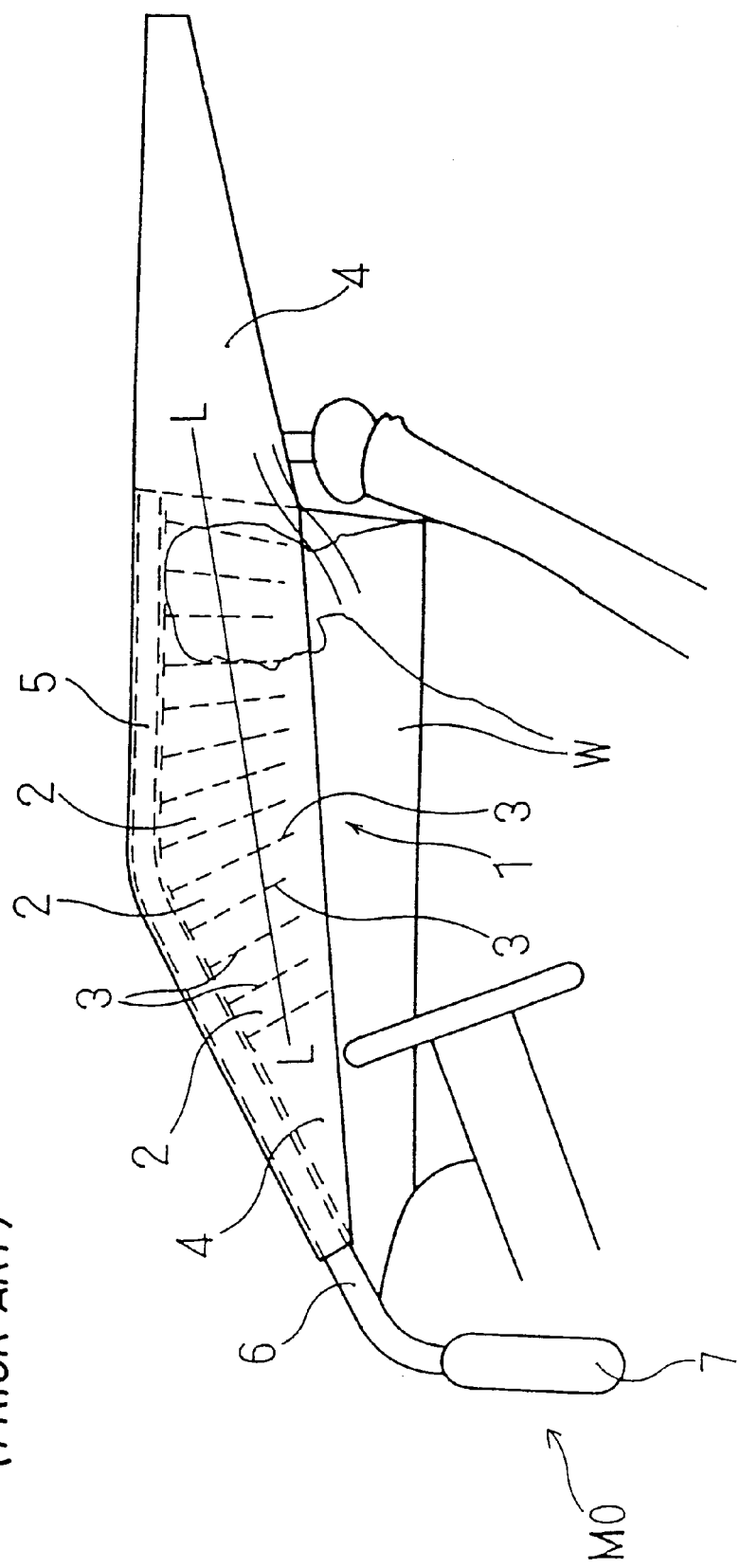
FIG. 38 is a diagram showing an air bag of the prior art.

Here, the air bag can be mounted like the foregoing air bags 51 and 511 on a four-door vehicle having front and rear seats, but can also be applied to a two-door car having two seats, as shown in FIG. 37. In this modification, the air bag 51 is constructed so as to wrap the center pillar CP when expanded.

On the other hand, the first and second embodiments have been described for the air bags 11 and 51 which are arranged from the front pillar FP to the roof side rail RR in the compartment. In spite of this description, however, the invention may be applied to an air bag to be arranged in such an inverted L-shaped portion of the peripheral edge of the opening W of the door as is extended from the quarter pillar QP at the rear side of the vehicle or the center pillar CP to the roof side rail RR within the compartment. In this modification, the inflator 24 and the gas inlet 19 are arranged under the quarter pillar QP or the center pillar CP.

Industrial Applicability

As has been described above, the air bag of a side air bag device according to the invention is useful for reducing the size and weight of the side air bag device.

What is claimed is:

1. An air bag for a side air bag device adapted to be mounted on the peripheral edge of a door opening inside of the compartment of a vehicular body, comprising:
   an air bag having a generally rectangular bag shape having a gas inlet for introducing an inflating gas so as to cover said door opening when inflated, and a tensing joint partially jointing an inner side wall and an outer side wall is arranged to form a tension line for establishing a tension from a lower side to an obliquely upper side of said door opening peripheral edge at the time of expansion,
   such that a plurality of said tensing joints are juxtaposed along the direction of said tension line so as to cross said tension line,
   such that said individual tensing joints are arranged generally at vertical middle portions so as to form one expansion chamber having upper and lower spaces for said inflating gas to flow therethrough, and
   such that said individual tensing joints are shaped to have curved bulges bulging toward said gas inlet.

2. An air bag for a side air bag device as set forth in claim 1, characterized in that said individual tensing joints have recesses at the side opposed to said gas inlet so as to be recessed toward said gas inlet.

3. An air bag for a side air bag device as set forth in claims 1 or 2, characterized in that a joint arranged at the peripheral edge for forming said expansion chamber and said individual joints for establishing said tension are formed by stitching said inner side wall and said outer side wall.

4. An air bag for a side air bag device as set forth in claims 1 or 2, characterized in that a joint arranged at the peripheral edge for forming said expansion chamber and said individual joints for establishing said tension are formed by stitching said inner side wall and said outer side wall together with a sheet material having elasticity disposed between said inner side wall and said outer side wall.

5. An air bag for a side air bag device as set forth in claim 3, wherein said individual tensing joints are formed by stitching said inner side wall and said outer side wall into a closed loop.

6. An air bag for a side air bag device as set forth in claim 1, such that a joint arranged at the peripheral edge for forming said expansion chamber and said individual joints for establishing said tension are formed by adhering said inner side wall and said outer side wall.

7. An air bag for a side air bag device as set forth in claim 1, characterized in that a front side fixed point is set under a front pillar, whereas a rear side fixed point is set in a roof side rail near a quarter pillar.

8. An air bag for a side air bag device as set forth in claim 1, characterized in that said air bag is so arranged that its expansion area includes when inflated, a portion of a center pillar so as to be supported by said center pillar when inflated.

9. An air bag for a side air bag device as set forth in claim 1, characterized in that a front side fixed point is set under a front pillar, whereas a rear side fixed point is set under a quarter pillar.

10. An air bag for a side air bag device as set forth in claim 1, characterized in that a front side fixed point is set under a front pillar.

11. An air bag for a side air bag device as set forth in claim 1, characterized in that a strap for jointing said inner side wall and said outer side wall to each other is arranged between said joints at the side of said gas inlet and a gas outlet.

12. An air bag for a side air bag device as set forth in claim 11, characterized in that said strap is arranged to have a width direction generally at a right angle with respect to the inflow direction of said expanding gas from said gas inlet.

13. An air bag for a side air bag device adapted to be mounted on the peripheral edge of a door opening inside of the compartment of a vehicular body, comprising:
an air bag having a generally rectangular bag shape having a gas inlet for introducing an inflating gas so as to cover said door opening when inflated, and having a tensing joint partially jointing an inner side wall and an outer side wall is arranged to form a tension line for establishing a tension at the time of expansion,
such that a plurality of said tensing joints are juxtaposed along the direction of said tension line so as to cross said tension line,
such that said individual tension joints are arranged generally at vertical middle portions so as to form one expansion
such that said air bag is so arranged that its expansion area includes, when inflated, a portion of a center pillar so as to be supported by said center pillar when expanded, and
such that said portion to be supported by the center pillar at the time of inflation is expanded such that said portion is thicker than the remaining ordinary expansion thickness.

14. An air bag for a side air bag device as set forth in claim 13, characterized in that the expansion to be supported by said center pillar at the time of expansion is formed such that a gap between the adjoining joints is set to be larger than that of the adjoining joints in the remaining ordinary expansion portions.

15. A side air bag device for installation in a vehicular body, comprising:
an air bag having an inner wall and an outer wall adapted to be mounted on a peripheral edge of a door opening on an inside of the vehicular body, and folded and accommodated along a roof side rail such that said air bag is capable of inflating to cover the door opening;
wherein said air bag includes an upper side mounted on said roof side rail of said vehicular body and a lower side extending in a front and a rear of the air bag and arranged to face said upper side and a free end of the air bag;
wherein a plurality of joints joint the inner wall and the outer wall in a position between said upper side and said lower side and restrict expansion of said air bag, said plurality of joints divide said upper side from said lower side;
wherein an upper space for an inflating gas to flow therethrough is defined in said upper side; and
wherein the air bag is folded in a bellows shape with said inner wall and said outer wall collapsed together and overlapping each other such that folded overlapping faces are generally at a right angle with respect to a door inside face of said vehicular body.

16. An air bag for a side air bag device as set forth in claim 15, characterized in that the expansion chamber of said air bag is manufactured by folding one cloth material and by jointing the peripheral edges of said cloth material excepting the creases thereof such that the creases of the cloth material at the time of forming said expansion chamber are arranged at the portions which are to be folded into the belows shape at the time of accommodation.

17. A side air bag for a side air bag device as set forth in claim 15 or 17, a projecting side joint in the peripheral edge of the cloth material for forming the expansion chamber is arranged to be cross folded in an overlapping direction when accommodated in said side air bag device.

18. An air bag for a side air bag device as set forth in claim 15, characterized:
in that said air bag is formed, when expanded, into a parallelogram bag shape having two sides of an upper side having mounting members to be mounted on the peripheral edge of the opening inside of the compartment, and an oblique side leading at an obtuse angle obliquely downward from said upper side; and
in that said air bag is folded and accommodated to have creases in parallel with said upper side and to overlap said upper side at a right angle.

19. An air bag for a side air bag device as set forth in claim 15, characterized in that said air bag is accommodated in a case to be fastened together on said body.

20. An air bag for a side air bag device as set forth in claim 15, characterized in that said air bag is wrapped, when accommodated, in a folded state.

21. The side air bag device as set forth in claim 15, wherein said joints are severally and linearly formed so as to extend in an up and down direction of said airbag and in a direction extending from the front to the rear of the airbag, such that a tension is established in said air bag when the air bag expands.

22. The side air bag device as set forth in claim 15, wherein said air bag defines a lower space for the expanding gas to flow therethrough, said lower space being defined in said lower side of said air bag.

23. A side air bag device for installation in a vehicular body, comprising:

an air bag having an inner wall and an outer wall adapted to be mounted on a peripheral edge of a door opening on an inside of the vehicular body, and folded and accommodated along a roof side rail such that said air bag is capable of expanding to cover the door opening;

wherein said air bag includes an upper side mounted on said roof side rail of said vehicular body and a lower side extending in a front and a rear of the air bag and arranged to face said upper side and a free end of the air bag;

wherein a plurality of joints join the inner wall and the outer wall in a position between said upper side and said lower side and restrict expansion of said air bag, said plurality of joints divide said upper side from said lower side;

wherein a lower space for an inflating gas to flow therethrough is defined in said lower side; and wherein the air bag is folded in a bellows shape with said inner wall and said outer wall collapsed together and overlapping each other such that folded overlapping faces are generally at a right angle with respect to a door inside face of said vehicular body.

24. The side air bag device as set forth in claim 23, wherein said joints are severally and linearly formed so as to extend in an up and down direction of said airbag and in a direction extending from the front to the rear of the airbag, such that a tension is established in said air bag when the air bag expands.

25. A side air bag device for installation in a vehicular body, comprising:

an air bag having an inner wall and an outer wall adapted to be mounted on a peripheral edge of a door opening on an inside of the vehicular body, and folded and accommodated along a roof side rail such that said air bag is capable of expanding to cover the door opening;

wherein said air bag includes an upper side mounted on said roof side rail of said vehicular body and a lower side extending in a front and a rear of the air bag and arranged to face said upper side and a free end of the air bag;

wherein a plurality of joints join the inner wall and the outer wall in a position between said upper side and said lower side and restrict expansion of said air bag, said plurality of joints divide said upper side from said lower side;

wherein an upper space for an inflating gas to flow therethrough is defined in said upper side of said air bag and a lower space for said inflating gas to flow therethrough is defined in said lower side; and wherein the air bag is folded in a bellows shape with said inner wall and said outer wall collapsed together and overlapping each other such that folded overlapping faces are generally at a right angle with respect to a door inside face.

26. The side air bag device as set forth in claim 25, wherein said joints are severally and linearly formed so as to extend in an up and down direction of said airbag and in a direction extending from the front to the rear of the airbag, such that a tension is established in said air bag when the air bag expands.

* * * * *